United States Patent
Shay

(10) Patent No.: US 12,401,550 B2
(45) Date of Patent: Aug. 26, 2025

(54) HIGH BANDWIDTH VGA/CTLE RECEIVER WITH DC GAIN FLATTENING AND COMMON-MODE CORRECTION ACROSS PROCESS, VOLTAGE, AND TEMPERATURE

(71) Applicant: Micron Technology, Inc., Boise, ID (US)

(72) Inventor: Michael John Shay, Fairview, TX (US)

(73) Assignee: Micron Technology, Inc., Boise, ID (US)

( * ) Notice: Subject to any disclaimer, the term of this patent is extended or adjusted under 35 U.S.C. 154(b) by 131 days.

(21) Appl. No.: 17/953,020

(22) Filed: Sep. 26, 2022

(65) Prior Publication Data
US 2024/0106687 A1    Mar. 28, 2024

(51) Int. Cl.
*H04L 25/03* (2006.01)
(52) U.S. Cl.
CPC .............. *H04L 25/03057* (2013.01)
(58) Field of Classification Search
CPC ......... H04L 25/03006; H04L 25/03019; H04L 25/03057; H04L 25/03254; H04L 25/03267
USPC .................. 375/232, 233, 348; 708/322, 323
See application file for complete search history.

(56) References Cited

U.S. PATENT DOCUMENTS

| | | | |
|---|---|---|---|
| 9,106,462 B1 * | 8/2015 | Aziz | H04L 25/03057 |
| 9,166,641 B1 * | 10/2015 | Li | H04L 25/03019 |
| 9,450,788 B1 * | 9/2016 | Cops | H04L 25/03057 |
| 9,917,607 B1 * | 3/2018 | Zhang | H04L 25/085 |
| 2017/0230018 A1 * | 8/2017 | Hwang | H04B 1/16 |
| 2019/0081604 A1 * | 3/2019 | Thiagarajan | H03F 3/4565 |
| 2019/0198068 A1 * | 6/2019 | Sreeramaneni | G11C 7/1078 |
| 2021/0119835 A1 * | 4/2021 | Levin | H04L 25/03146 |
| 2022/0014400 A1 * | 1/2022 | Hadar | H04L 25/03885 |

* cited by examiner

*Primary Examiner* — Young T. Tse
(74) *Attorney, Agent, or Firm* — Fletcher Yoder, P.C.

(57) ABSTRACT

A device includes an amplifying device that when in operation transmits a data signal and a reference signal to a decision feedback equalizer (DFE) circuit. The amplifying device includes a variable gain amplifier (VGA) that when in operation generates the reference signal as having a predetermined gain relative to a received input signal and a continuous-time linear equalizer (CTLE) that operate to mitigate inter-symbol interference (IR) on the data signal from a data stream comprising the data signal. The device further includes correction circuitry coupled to the amplifying device, wherein the correction circuitry when in operation mitigates variation in the predetermined gain of the VGA or variation in an output common-mode voltage of the VGA.

14 Claims, 15 Drawing Sheets

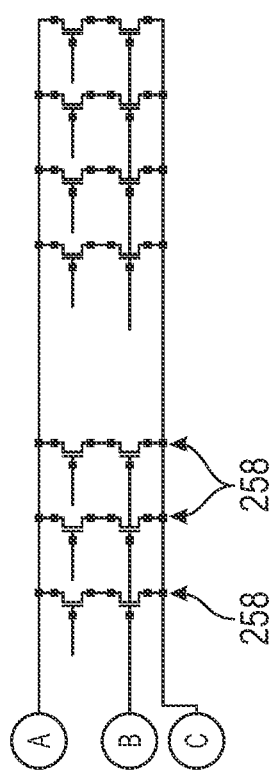

HIGH BANDWIDTH VGA/CTLE RECEIVER WITH DC GAIN FLATTENING AND COMMON-MODE CORRECTION ACROSS PROCESS, VOLTAGE, AND TEMPERATURE

BACKGROUND

Field of the Invention

Embodiments of the present disclosure relate generally to the field of semiconductor memory devices. More specifically, embodiments of the present disclosure relate to compensation of common-mode variation in continuous time linear equalizer (CTLE) and variable gain amplifier (VGA) circuitry utilized in a receiver.

Description of the Related Art

The operational rate of memory devices, including the data rate of a memory device, has been increasing over time. As a side effect of the increase in speed of a memory device, data errors due to distortion may increase. For example, inter-symbol interference between transmitted data whereby previously received data influences the currently received data may occur (e.g., previously received data affects and interferes with subsequently received data). One manner to correct for this interference is through the use of a decision feedback equalizer (DFE) circuit, which may be programmed to offset (i.e., undo or mitigate) the effect of the channel on the transmitted data.

To insure the proper functioning of the DFE circuit, reliable input signals should be available. However, variations to conditions affecting the device (e.g., variations due to process, voltage, temperature, etc.) can cause alterations in signals provided to the DFE. Thus, as devices increase in complexity, differences between anticipated signals and actual signals generated in the operation of the device reduces the operational ability of the device.

Embodiments of the present disclosure may be directed to one or more of the problems set forth above.

BRIEF DESCRIPTION OF THE DRAWINGS

Various aspects of this disclosure may better be understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Using a decision feedback equalizer (DFE) of a memory device to perform distortion correction techniques may be valuable, for example, to correctly compensate for distortions in the received data of the memory device. This insures that accurate values are being stored in the memory of the memory device. The DFE may use previous bit data to create corrective values to compensate for distortion resulting from previously received data bit(s). For example, the most recent previous bit may have more of a distortion effect on the current bit than a bit transmitted several data points before, causing the corrective values to be different between the two bits. With these levels to correct for, the DFE may operate to correct the distortion of the transmitted bit.

However, during manufacture and/or operation of a memory device, there may be fluctuations introduced to signals transmitted to the DFE. Causes for this fluctuation may be process, voltage, temperature (PVT), and/or other influences. Accordingly, implementation of one or more compensation circuits in conjunction with the circuitry that supplies signals to the DFE may be utilized to compensate for the fluctuations introduced by, for example, PVT and/or other influences.

Figure 1:
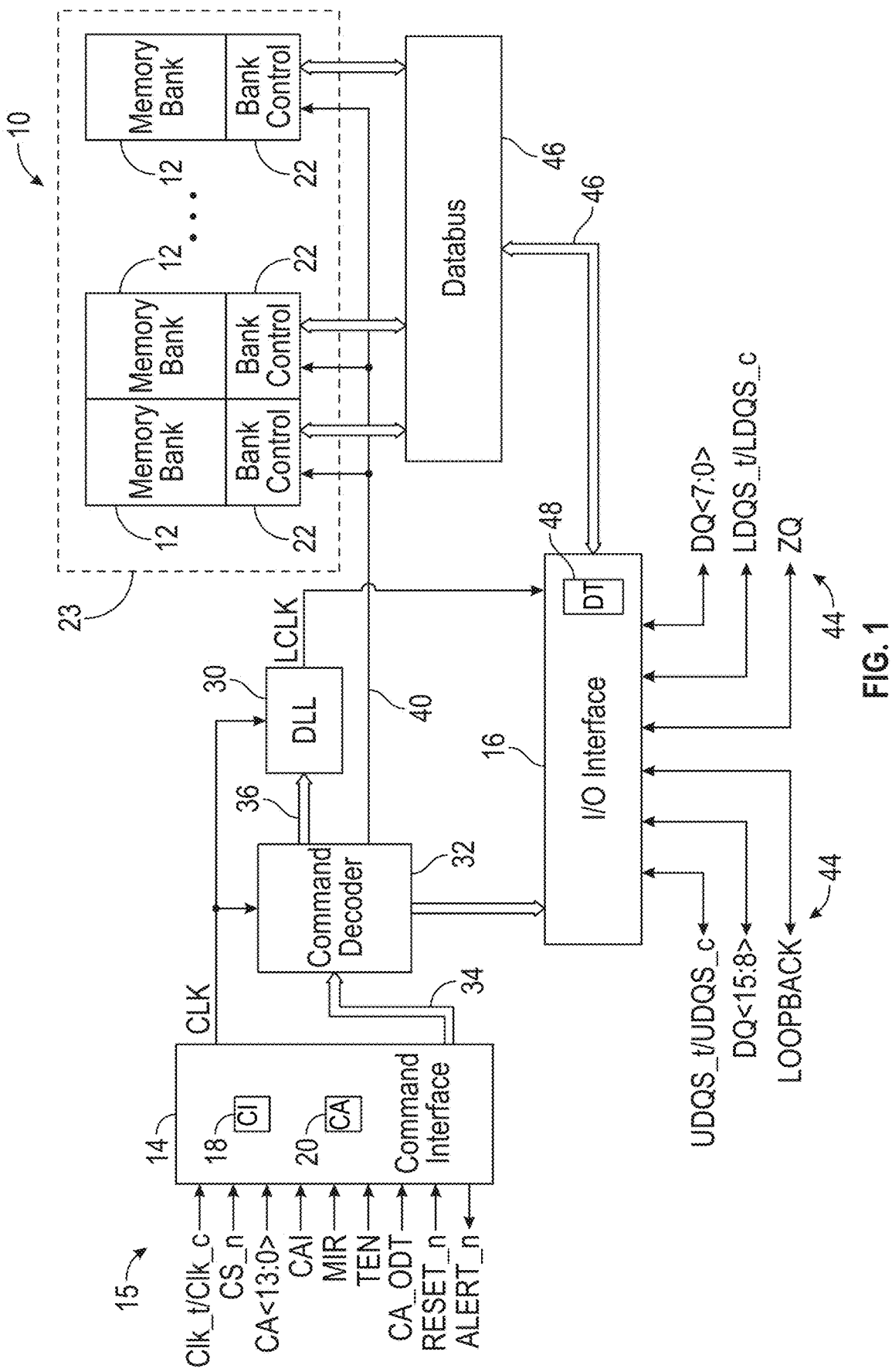
FIG. 1 is a simplified block diagram illustrating certain features of a memory device, according to an embodiment of the present disclosure.

Turning now to the figures, FIG. 1 is a simplified block diagram illustrating certain features of a memory device 10. Specifically, the block diagram of FIG. 1 is a functional block diagram illustrating certain functionality of the memory device 10. In accordance with one embodiment, the memory device 10 may be a double data rate type five synchronous dynamic random access memory (DDR5 SDRAM or DDR5) device. Various features of DDR5 SDRAM allow for reduced power consumption, more bandwidth and more storage capacity compared to prior generations of DDR SDRAM. However, more generally, the memory device 10 may be a random access memory (RAM) device, a dynamic RAM (DRAM) device, a static RAM (SRAM) device (including a double data rate SRAM device), flash memory, and/or a phase change memory (PCM) device and/or other chalcogenide-based memory, such as self-selecting memories (SSM), a double data rate type four synchronous dynamic random access memory (DDR4 SDRAM) device, a low power double data rate type four synchronous dynamic random access memory (LPDDR4 SDRAM), a low power double data rate type five synchronous dynamic random access memory (LPDDR5 SDRAM) device, or another type of device.

The memory device 10, may include a number of memory banks 12. The memory banks 12 may be DDR5 SDRAM memory banks, for instance. The memory banks 12 may be provided on one or more chips (e.g., SDRAM chips) that are arranged on dual inline memory modules (DIMMS). Each DIMM may include a number of SDRAM memory chips (e.g., x8 or x16 memory chips), as will be appreciated. Each SDRAM memory chip may include one or more memory banks 12. The memory device 10 represents a portion of a single memory chip (e.g., SDRAM chip) having a number of memory banks 12. For DDR5, the memory banks 12 may be further arranged to form bank groups. For instance, for an 8 gigabit (Gb) DDR5 SDRAM, the memory chip may include 16 memory banks 12, arranged into 8 bank groups, each bank group including 2 memory banks. For a 16 GB DDR5 SDRAM, the memory chip may include 32 memory banks 12, arranged into 8 bank groups, each bank group including 4 memory banks, for instance. Various other configurations, organization and sizes of the memory banks 12 on the memory device 10 may be utilized depending on the application and design of the overall system.

The memory device 10 may include a command interface 14 and an input/output (I/O) interface 16 configured to exchange (e.g., receive and transmit) signals with external devices. The command interface 14 is configured to provide a number of signals (e.g., signals 15) from an external device (not shown), such as a processor or controller (e.g., present in a host device coupled to the memory device 10). The processor or controller may provide various signals 15 to the memory device 10 to facilitate the transmission and receipt of data to be written to or read from the memory device 10.

As will be appreciated, the command interface 14 may include a number of circuits, such as a clock input circuit 18 and a command address input circuit 20, for instance, to ensure proper handling of the signals 15. The command interface 14 may receive one or more clock signals from an external device. Generally, double data rate (DDR) memory utilizes a differential pair of system clock signals, referred to herein as the true clock signal (Clk_t) and the complementary clock signal (Clk_c). The positive clock edge for DDR refers to the point where the rising true clock signal Clk_t crosses the falling complementary clock signal Clk_c, while the negative clock edge indicates the transition of the falling true clock signal Clk_t and the rising of the complementary clock signal Clk_c. Commands (e.g., read command, write command, etc.) are typically entered on the positive edges of the clock signal and data is transmitted or received on both the positive and negative clock edges.

The clock input circuit 18 receives the true clock signal (Clk_t) and the complementary clock signal (Clk_c) and generates an internal clock signal CLK. The internal clock signal CLK is supplied to an internal clock generator 30, such as a delay locked loop (DLL) circuit. The internal clock generator 30 generates a phase controlled internal clock signal LCLK based on the received internal clock signal CLK. The phase controlled internal clock signal LCLK is supplied to the input/output (I/O) interface 16, for instance, and is used as a timing signal for determining an output timing of read data.

The internal clock signal CLK may also be provided to various other components within the memory device 10 and may be used to generate various additional internal clock signals. For instance, the internal clock signal CLK may be provided to a command decoder 32. The command decoder 32 may receive command signals from the command bus 34 and may decode the command signals to provide various internal commands. For instance, the command decoder 32 may provide command signals to the internal clock generator 30 over the bus 36 to coordinate generation of the phase controlled internal clock signal LCLK. The phase controlled internal clock signal LCLK may be used to clock data through the I/O interface 16, for instance.

Further, the command decoder 32 may decode commands, such as read commands, write commands, mode-register set commands, activate commands, etc., and provide access to a particular memory bank 12 corresponding to the command, via the bus path 40. As will be appreciated, the memory device 10 may include various other decoders, such as row decoders and column decoders, to facilitate access to the memory banks 12. In one embodiment, each memory bank 12 includes a bank control block 22 which provides decoding (e.g., row decoder and column decoder), as well as other features, such as timing control and data control, to facilitate the execution of commands to and from the memory banks 12. Collectively, the memory banks 12 and the bank control blocks 22 may be referred to as a memory array 23.

The memory device 10 executes operations, such as read commands and write commands, based on the command/address signals received from an external device, such as a processor. In one embodiment, the command/address bus may be a 14-bit bus to accommodate the command/address signals (CA<13:0>). The command/address signals are clocked to the command interface 14 using the clock signals (Clk_t and Clk_c). The command interface may include a command address input circuit 20 which is configured to receive and transmit the commands to provide access to the memory banks 12, through the command decoder 32, for instance. In addition, the command interface 14 may receive a chip select signal (CS_n). The CS_n signal enables the memory device 10 to process commands on the incoming CA<13:0> bus. Access to specific banks 12 within the memory device 10 is encoded on the CA<13:0> bus with the commands.

In addition, the command interface 14 may be configured to receive a number of other command signals. For instance, a command/address on die termination (CA_ODT) signal may be provided to facilitate proper impedance matching within the memory device 10. A reset command (RESET_n) may be used to reset the command interface 14, status registers, state machines and the like, during power-up for instance. The command interface 14 may also receive a command/address invert (CAI) signal which may be provided to invert the state of command/address signals CA<13:0> on the command/address bus, for instance, depending on the command/address routing for the particular memory device 10. A mirror (MIR) signal may also be provided to facilitate a mirror function. The MIR signal may be used to multiplex signals so that they can be swapped for enabling certain routing of signals to the memory device 10, based on the configuration of multiple memory devices in a particular application. Various signals to facilitate testing of the memory device 10, such as the test enable (TEN) signal, may be provided as well. For instance, the TEN signal may be used to place the memory device 10 into a test mode for connectivity testing.

The command interface 14 may also be used to provide an alert signal (ALERT n) to the system processor or controller for certain errors that may be detected. For instance, an alert signal (ALERT n) may be transmitted from the memory device 10 if a cyclic redundancy check (CRC) error is detected. Other alert signals may also be generated. Further, the bus and pin for transmitting the alert signal (ALERT n) from the memory device 10 may be used as an input pin during certain operations, such as the connectivity test mode executed using the TEN signal, as described above.

Data may be sent to and from the memory device 10, utilizing the command and clocking signals discussed above, by transmitting and receiving data signals 44 through the I/O interface 16. More specifically, the data may be sent to or retrieved from the memory banks 12 over the data bus 46, which includes a plurality of bi-directional data buses. Data I/O signals, generally referred to as DQ signals, are generally transmitted and received in one or more bi-directional data busses. For certain memory devices, such as a DDR5 SDRAM memory device, the I/O signals may be divided into upper and lower bytes. For instance, for an x16 memory device, the I/O signals may be divided into upper and lower I/O signals (e.g., DQ<15:8> and DQ<7:0>) corresponding to upper and lower bytes of the data signals, for instance.

To allow for higher data rates within the memory device 10, certain memory devices, such as DDR memory devices may utilize data strobe signals, generally referred to as DQS signals. The DQS signals are driven by the external processor or controller sending the data (e.g., for a write command) or by the memory device 10 (e.g., for a read command). For read commands, the DQS signals are effectively additional data output (DQ) signals with a predetermined pattern. For write commands, the DQS signals are used as clock signals to capture the corresponding input data. As with the clock signals (Clk_t and Clk_c), the data strobe (DQS) signals may be provided as a differential pair of data strobe signals (DQS t and DQS c) to provide differential pair signaling during reads and writes. For certain memory devices, such as a DDR5 SDRAM memory device, the differential pairs of DQS signals may be divided into upper and lower data strobe signals (e.g., UDQS_t and UDQS_c; LDQS_t and LDQS_c) corresponding to upper and lower bytes of data sent to and from the memory device 10, for instance.

An impedance (ZQ) calibration signal may also be provided to the memory device 10 through the I/O interface 16. The ZQ calibration signal may be provided to a reference pin and used to tune output drivers and on die termination values (ODT) by adjusting pull-up and pull-down resistors of the memory device 10 across changes in process, voltage and temperature (PVT) values. Because PVT characteristics may impact the ZQ resistor values, the ZQ calibration signal may be provided to the ZQ reference pin to be used to adjust the resistance to calibrate the input impedance to known values. As will be appreciated, a precision resistor is generally coupled between the ZQ pin on the memory device 10 and GND/VSS external to the memory device 10. This resistor acts as a reference for adjusting internal ODT and drive strength of the I/O pins.

In addition, a loopback signal (LOOPBACK) may be provided to the memory device 10 through the I/O interface 16. The loopback signal may be used during a test or debugging phase to set the memory device 10 into a mode wherein signals are looped back through the memory device 10 through the same pin. For instance, the loopback signal may be used to set the memory device 10 to test the data output of the memory device 10. Loopback may include both a data and a strobe or possibly just a data pin. This is generally intended to be used to monitor the data captured by the memory device 10 at the I/O interface 16.

As will be appreciated, various other components such as power supply circuits (for receiving external VDD and VSS signals), mode registers (to define various modes of programmable operations and configurations), read/write amplifiers (to amplify signals during read/write operations), temperature sensors (for sensing temperatures of the memory device 10), etc., may also be incorporated into a memory system incorporating the memory device 10. Accordingly, it should be understood that the block diagram of FIG. 1 is only provided to highlight certain functional features of the memory device 10 to aid in the subsequent detailed description.

In some embodiments, the memory device 10 may be disposed in (physically integrated into or otherwise connected to) a host device or otherwise coupled to a host device. The host device may include any one of a desktop computer, laptop computer, pager, cellular phone, personal organizer, portable audio player, control circuit, camera, etc. The host device may also be a network node, such as a router, a server, or a client (e.g., one of the previously-described types of computers). The host device may be some other sort of electronic device, such as a copier, a scanner, a printer, a game console, a television, a set-top video distribution or recording system, a cable box, a personal digital media player, a factory automation system, an automotive computer system, or a medical device. (The terms used to describe these various examples of systems, like many of the other terms used herein, may share some referents and, as such, should not be construed narrowly in virtue of the other items listed.)

The host device may, thus, be a processor-based device, which may include a processor, such as a microprocessor, that controls the processing of system functions and requests in the host. Further, any host processor may comprise a plurality of processors that share system control. The host processor may be coupled directly or indirectly to additional system elements of the host, such that the host processor controls the operation of the host by executing instructions that may be stored within the host or external to the host.

As discussed above, data may be written to and read from the memory device 10, for example, by the host whereby the memory device 10 operates as volatile memory, such as Double Data Rate DRAM (e.g., DDR5 SDRAM). The host may, in some embodiments, also include separate non-volatile memory, such as read-only memory (ROM), PC-RAM, silicon-oxide-nitride-oxide-silicon (SONOS) memory, metal-oxide-nitride-oxide-silicon (MONOS) memory, polysilicon floating gate based memory, and/or other types of flash memory of various architectures (e.g., NAND memory, NOR memory, etc.) as well as other types of memory devices (e.g., storage), such as solid state drives (SSD's), MultimediaMediaCards (MMC's), SecureDigital (SD) cards, CompactFlash (CF) cards, or any other suitable device. Further, it should be appreciated that the host may include one or more external interfaces, such as Universal Serial Bus (USB), Peripheral Component Interconnect (PCI), PCI Express (PCI-E), Small Computer System Interface (SCSI), IEEE 1394 (Firewire), or any other suitable interface as well as one or more input devices to allow a user to input data into the host, for example, buttons, switching elements, a keyboard, a light pen, a stylus, a mouse, and/or a voice recognition system, for instance. The host may optionally also include an output device, such as a display coupled to the processor and a network interface device, such as a Network Interface Card (NIC), for interfacing with a network, such as the Internet. As will be appreciated, the host may include many other components, depending on the application of the host.

The host may operate to transfer data to the memory device 10 for storage and may read data from the memory device 10 to perform various operations at the host. Accordingly, to facilitate these data transmissions, in some embodiments, the I/O interface 16 may include a data transceiver 48 that operates to receive and transmit DQ signals to and from the I/O interface 16.

Figure 2:
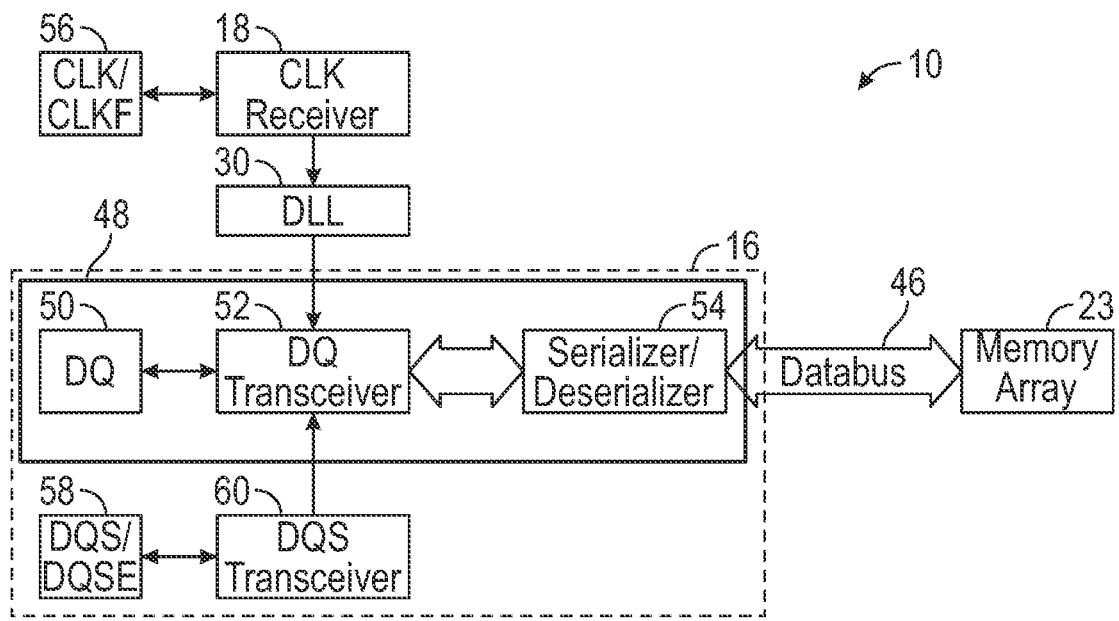
FIG. 2 is a block diagram illustrating a data transceiver of the I/O interface of FIG. 1, according to an embodiment of the present disclosure.

FIG. 2 illustrates the I/O interface 16 of the memory device 10 generally and, more specifically, the data transceiver 48. As illustrated, the data transceiver 48 of the I/O interface 16 may include a DQ connector 50, a DQ transceiver 52, and a serializer/deserializer 54. It should be noted that in some embodiments, multiple data transceivers 48 may be utilized whereby each single data transceiver 48 may be utilized in connection with a respective one of each of upper and lower I/O signals (e.g., DQ<15:8> and DQ<7:0>) corresponding to upper and lower bytes of the data signals, for instance. Thus, the I/O interface 16 may include a plurality of data transceivers 48, each corresponding to one or more I/O signals (e.g., inclusive of a respective DQ connector 50, DQ transceiver 52, and serializer/deserializer 54).

The DQ connector 50 may be, for example a pin, pad, combination thereof, or another type of interface that operates to receive DQ signals, for example, for transmission of data to the memory array 23 as part of a data write operation. Additionally, the DQ connector 50 may operate to transmit DQ signals from the memory device 10, for example, to transmit data from the memory array 23 as part of a data read operation. To facilitate these data reads/writes, a DQ transceiver 52 is present in data transceiver 48. In some embodiments, for example, the DQ transceiver 52 may receive a clock signal generated by the internal clock generator 30 as a timing signal for determining an output timing of a data read operation from the memory array 23. The clock signal transmitted by the internal clock generator 30 may be based upon one or more clocking signals received by the memory device 10 at clock connector 56 (e.g., a pin, pad, the combination thereof, etc.) and routed to the internal clock generator 30 via the clock input circuit 18. Thus, the DQ transceiver 52 may receive a clock signal generated by the internal clock generator 30 as a timing signal for determining an output timing of a data read operation from the memory array 23.

The DQ transceiver 52 of FIG. 2 may also, for example, receive one or more DQS signals to operate in a strobe data mode as part of a data write operation. The DQS signals may be received at a DQS connector 58 (e.g., a pin, pad, the combination thereof, etc.) and routed to the DQ transceiver 52 via a DQS transceiver 60 that operates to control a data strobe mode via selective transmission of the DQS signals to the DQ transceiver 52. Thus, the DQ transceiver 52 may receive DQS signals to control a data write operation from the memory array 23.

As noted above, the data transceiver 48 may operate in modes to facilitate the transfers of the data to and from the memory device 10 (e.g., to and from the memory array 23). For example, to allow for higher data rates within the memory device 10, a data strobe mode in which DQS signals are utilized, may occur. The DQS signals may be driven by an external processor or controller sending the data (e.g., for a write command) as received by the DQS connector 58 (e.g., a pin, pad, the combination thereof, etc.). In some embodiments, the DQS signals are used as clock signals to capture the corresponding input data.

In addition, as illustrated in FIG. 2, the data transceiver 48 also includes a serializer/deserializer 54 that operates to translate serial data bits (e.g., a serial bit stream) into parallel data bits (e.g., a parallel bit stream) for transmission along data bus 46 during data write operations of the memory device 10. Likewise, the serializer/deserializer 54 operates to translate parallel data bits (e.g., a parallel bit stream) into serial data bits (e.g., a serial bit stream) during read operations of the memory device 10. In this manner, the serializer/deserializer 54 operates to translate data received from, for example, a host device having a serial format into a parallel format suitable for storage in the memory array 23. Likewise, the serializer/deserializer 54 operates to translate data received from, for example, the memory array 23 having a parallel format into a serial format suitable for transmission to a host device.

Figure 3:
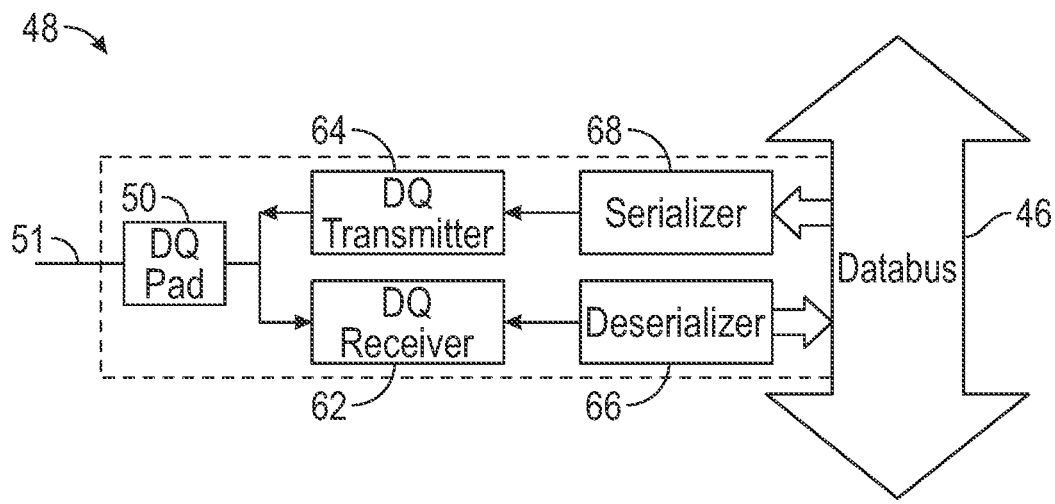
FIG. 3 illustrates a block diagram of an embodiment of the data transceiver of FIG. 2, according to an embodiment of the present disclosure.

FIG. 3 illustrates the data transceiver 48 as including the DQ connector 50 coupled to data transfer bus 51, a DQ receiver 62, a DQ transmitter 64 (which in combination with the DQ receiver 62 forms the DQ transceiver 52), a deserializer 66, and a serializer 68 (which in combination with the deserializer 66 forms the serializer/deserializer 54). In operation, the host (e.g., a host processor or other memory device described above) may operate to transmit data in a serial form across data transfer bus 51 to the data transceiver 48 as part of a data write operation to the memory device 10. This data is received at the DQ connector 50 and transmitted to the DQ receiver 62. The DQ receiver 62, for example, may perform one or more operations on the data (e.g., amplification, driving of the data signals, etc.) and/or may operate as a latch for the data until reception of a respective DQ S signal that operates to coordinate (e.g., control) the transmission of the data to the deserializer 66. As part of a data write operation, the deserializer 66 may operate to convert (e.g., translate) data from a format (e.g., a serial form) in which it is transmitted along data transfer bus 51 into a format (e.g., a parallel form) used for transmission of the data to the memory array 23 for storage therein.

Likewise, during a read operation (e.g., reading data from the memory array 23 and transmitting the read data to the host via the data transfer bus 51), the serializer 68 may receive data read from the memory array 23 in one format (e.g., a parallel form) used by the memory array 23 and may convert (e.g., translate) the received data into a second format (e.g., a serial form) so that the data may be compatible with one or more of the data transfer bus 51 and/or the host. The converted data may be transmitted from the serializer 68 to the DQ transmitter 64, whereby one or more operations on the data (e.g., de-amplification, driving of the data signals, etc.) may occur. Additionally, the DQ transmitter 64 may operate as a latch for the received data until reception of a respective clock signal, for example, from the internal clock generator 30, that operates to coordinate (e.g., control) the transmission of the data to the DQ connector 50 for transmission along the data transfer bus 51 to one or more components of the host.

Figure 4:
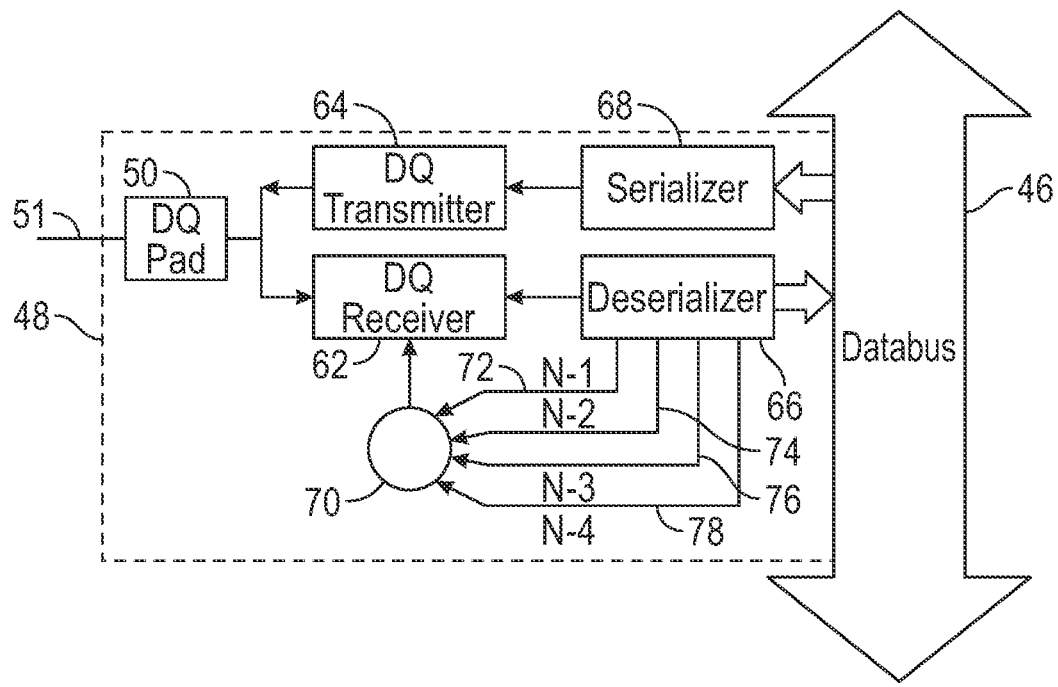
FIG. 4 illustrates a block diagram of a second embodiment of the data transceiver of FIG. 2, according to an embodiment of the present disclosure.

In some embodiments, the data received at the DQ connector 50 may be distorted. For example, data received at the DQ connector 50 may be affected by inter-symbol interference (ISI) in which previously received data interferes with subsequently received data. For example, due to increased data volume being transmitted across the data transfer bus 51 to the DQ connector 50, the data received at the DQ connector 50 may be distorted relative to the data transmitted by the host. One technique to mitigate (e.g., offset or cancel) this distortion and to effectively reverse the effects of ISI is to apply an equalization operation to the data. FIG. 4 illustrates an embodiment of the data transceiver 48 inclusive of an equalizer that may be used in this equalization operation.

FIG. 4 illustrates one embodiment of the data transceiver 48 inclusive of an equalizer, in particular, a decision feedback equalizer (DFE) 70. As illustrated, the DFE 70 is a multi-tap (e.g., four-tap) DFE 70. However, less or more than four taps may be utilized in conjunction with the DFE 70. Likewise, the DFE 70 may be disposed separate from or internal to the deserializer 66 or the DQ receiver 62. In operation, a binary output (e.g., from a latch or decision-making slicer) is captured in one or more data latches or data registers. In the present embodiment, these data latches or data registers may be disposed in the deserializer 66 and the values stored therein may be latched or transmitted along paths 72, 74, 76, and 78.

When a data bit is received at the DQ receiver 62, it may be identified as being transmitted from the host as bit "n" and may be received at a time to as distorted bit n (e.g., bit n having been distorted by ISI). The most recent bit received prior to distorted bit n being received at the DQ receiver 62, e.g., received at time of $t_{-1}$ that immediately precedes time of to, may be identified as n−1 and is illustrated as being transmitted from a data latch or data register along path 72. The second most recent bit received prior to distorted bit n being received at the DQ receiver 62, e.g., received at time of $t_{-2}$ that immediately precedes time of $t_{-1}$, may be identified as n−2 and is illustrated as being transmitted from a data latch or data register along path 74. The third most recent bit received prior to distorted bit n being received at the DQ receiver 62, e.g., received at time of $t_{-3}$ that immediately precedes time of $t_{-2}$, may be identified as n−3 and is illustrated as being transmitted from a data latch or data register along path 76. The fourth most recent bit received prior to distorted bit n being received at the DQ receiver 62, e.g., received at time of $t_{-4}$ that immediately precedes time of $t_{-3}$, may be identified as n−4 and is illustrated as being transmitted from a data latch or data register along path 78. Bits n−1, n−2, n−3, and n−4 may be considered the group of bits that interfere with received distorted bit n (e.g., bits n−1, n−2, n−3, and n−4 cause ISI to host transmitted bit n) and the DFE 70 may operate to offset the distortion caused by the group of bits n−1, n−2, n−3, and n−4 on host transmitted bit n.

Thus, the values latched or transmitted along paths 72, 74, 76, and 78 may correspond, respectively, to the most recent previous data values (e.g., preceding bits n−1, n−2, n−3, and n−4) transmitted from the DQ receiver 62 to be stored in memory array 23. These previously transmitted bits are fed back along paths 72, 74, 76, and 78 to the DFE 70, which operates to generate weighted taps (e.g., voltages) that may be and added to the received input signal (e.g., data received from the DQ connector 50, such as distorted bit n) by means of a summer (e.g., a summing amplifier). In other embodiments, the weighted taps (e.g., voltages) may be combined with an initial reference value to generate an offset that corresponds to or mitigates the distortion of the received data (e.g., mitigates the distortion of distorted bit n). In some embodiments, taps are weighted to reflect that the most recent previously received data (e.g., bit n−1) may have a stronger influence on the distortion of the received data (e.g., distorted bit n) than bits received at earlier times (e.g., bits n−2. n−3, and n−4). The DFE 70 may operate to generate magnitudes and polarities for taps (e.g., voltages) due to each previous bit to collectively offset the distortion caused by those previously received bits.

For example, for the present embodiment, each of previously received bits n−1, n−2, n−3, and n−4 could have had one of two values (e.g., a binary 0 or 1), which was transmitted to the deserializer 66 for transmission to the memory array 23 and, additionally, latched or saved in a register for subsequent transmission along respective paths 72, 74, 76, and 78. In the illustrated embodiment, this leads to sixteen (e.g., $2^4$) possible binary combinations (e.g., 0000, 0001, 0010, . . . , 1110, or 1111) for the group of bits n−1, n−2, n−3, and n−4. The DFE 70 operates to select and/or generate corresponding tap values for whichever of the aforementioned sixteen combinations are determined to be present (e.g., based on the received values along paths 72, 74, 76, and 78) to be used to adjust either the input value received from the DQ connector 50 (e.g., distorted bit n) or to modify a reference value that is subsequently applied to the input value received from the DQ connector 50 (e.g., distorted bit n) so as to cancel the ISI distortion from the previous bits in the data stream (e.g., the group of bits n−1, n−2, n−3, and n−4).

Use of distortion correction (e.g., a DFE 70) may be beneficial such that data transmitted from the DQ connector 50 is correctly represented in the memory array 23 without distortion. Accordingly, it may be useful to store the previous bit data to use in the distortion correction. As illustrated in the block diagram of FIG. 5, a distortion correction circuit 80 may be included as part of the DQ receiver 62 but may not be required to be physically located there (e.g., the distortion correction circuit 80 may instead be coupled to the DQ receiver 62). In some embodiments, the distortion correction circuit 80 may be operated to provide previously transmitted bit data to correct a distorted bit 81 (e.g., bit having been distorted by ISI and/or system distortions) transmitted via a channel 84 (e.g., connection, transmission line, and/or conductive material).

The distorted bit 81 may be transmitted to an amplifying device 82 from a channel 84. The amplifying device 82 may be, for example, a variable gain amplifier. The distorted bit 81 may be transmitted from the amplifying device 82 to the DFE 70, illustrated as having a single weighted tap 86. The distorted bit 81 may be transmitted simultaneously with a DQ reference signal 83 to the DFE 70. The DQ reference signal 83 may represent a threshold value (e.g., a voltage level) for determination if the transmitted bit received by the DQ connector 50 was a logical low (e.g., 0) or a logical high (e.g., 1). Thus, data bits may be received at input 87 of the amplifying device 82 and a reference signal (e.g., the DQ reference signal 83) may be received at input 89 of the amplifying device 82.

In the illustrated example, the DFE 70 may be operated to correct the distortion from the distorted bit 81 using the tap weighted with previous bit data (e.g., n−1 bit data). Data (e.g., logical 1 or logical 0) for an n−1 bit may be transmitted through the path 72. The magnitudes and polarities of the single weighted tap 86 may offset the total distortion caused by the n−1 bit via summer circuit 85, which operates as a current summer that applies current to the distorted bit 81 to offset for distortion caused by the n−1 bit. For example, if the received bit at the DQ connector 50 is determined to be below the DQ reference signal 83, the received bit 81 is transmitted to the memory array 23 as a logical low. The magnitude and polarity of the weighted tap 86 may be able to correct the distorted bit 81 and the DQ reference signal 83. Indeed, a modified version of the distorted bit 81 and a modified version of the DQ reference signal 83 may be transmitted to a data latch 94. A corrected bit 88 may be generated via the data latch 94 and transmitted from the data latch 94 to the deserializer 66, which may occur on the rising edge of the DQS signal 96. In other embodiments, variations of the clocking scheme may be followed to be inclusive of additional or alternative methods of data transmission. The value for the new n−1 bit may be stored, for example, in the deserializer 66 for transmission along the path 72 when the corrected bit 88 is received in the deserializer 66.

Figure 5:
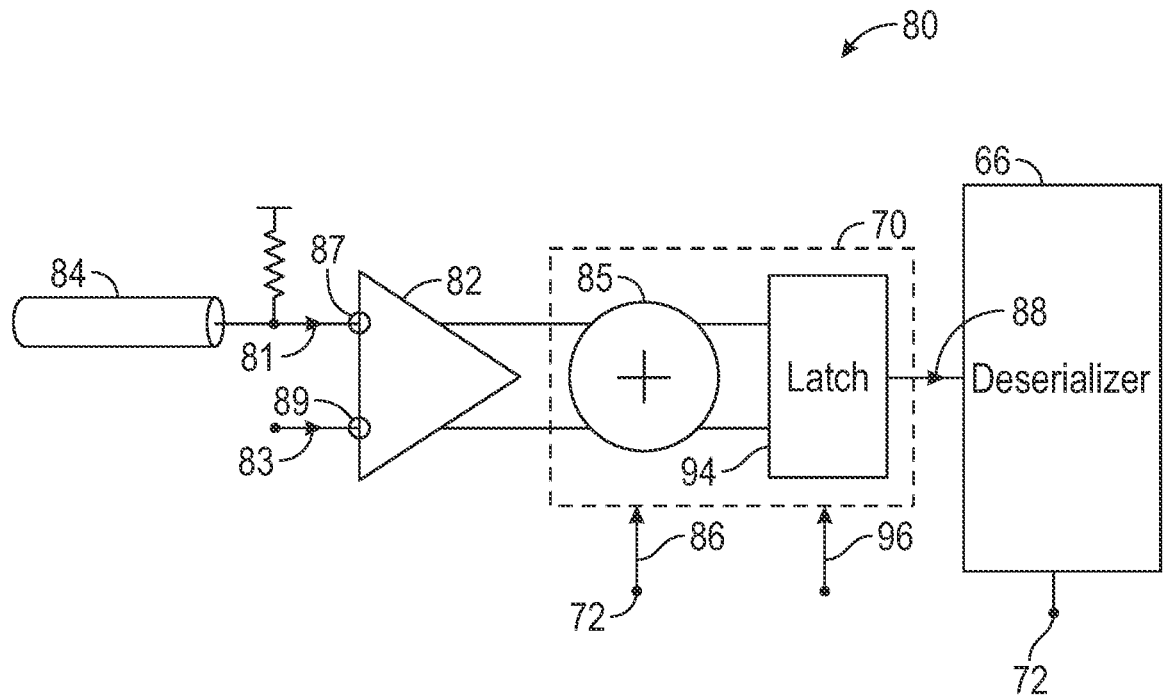
FIG. 5 illustrates a block diagram of a distortion correction circuit, according to an embodiment of the present disclosure.

In some embodiments, the amplifying device 82 of FIG. 5 may represent a variable gain amplifier and continuous-time linear equalizer (CTLE). The output of the variable gain amplifier may be set to predetermined levels (e.g., settings), for example, values approximately between 0.5 times and 2.0 times the DC reference signal input to the variable gain amplifier or another level. The CTLE may operate to, for example, mitigate inter-symbol interference (ISI). More particularly, the CTLE generally operates to offset losses in the data stream (leading to a distorted bit 81) caused by, for example, the channel 84. The CTLE can generally operate to amplify higher frequency content of the data stream to equalize for these effects to the data stream (i.e., to boost higher frequency content, therefore making it effectively equivalent to amplitude at lower frequency components of the data stream). Accordingly, use of a CTLE in addition to a variable gain amplifier can operate to provide more reliable signals to the DFE 70 (e.g., increase the reliability of one or more of the distorted bit 81). Additionally, as noted above, the amplifying device 82 utilizes a DQ reference signal 83. However, PVT and/or other influences (e.g., supply voltage variations) can disrupt the operation of the amplifying device 82, for example, in the DC gain of the amplifying device and/or the output common-mode voltage (also referred to herein as output common-mode). This can, for example, affect the reliability of the DQ reference signal 83. Accordingly in some embodiments, one or more compensation circuits can be utilized in conjunction with the amplifying device 82. These one or more compensation circuits may be included as part of the DQ receiver 62, but may not be required to be physically located there (e.g., the one or more compensation circuits may instead be coupled to the DQ receiver 62 and internal to, for example, the data transceiver 48 or internal to the I/O interface 16).

Figure 6:
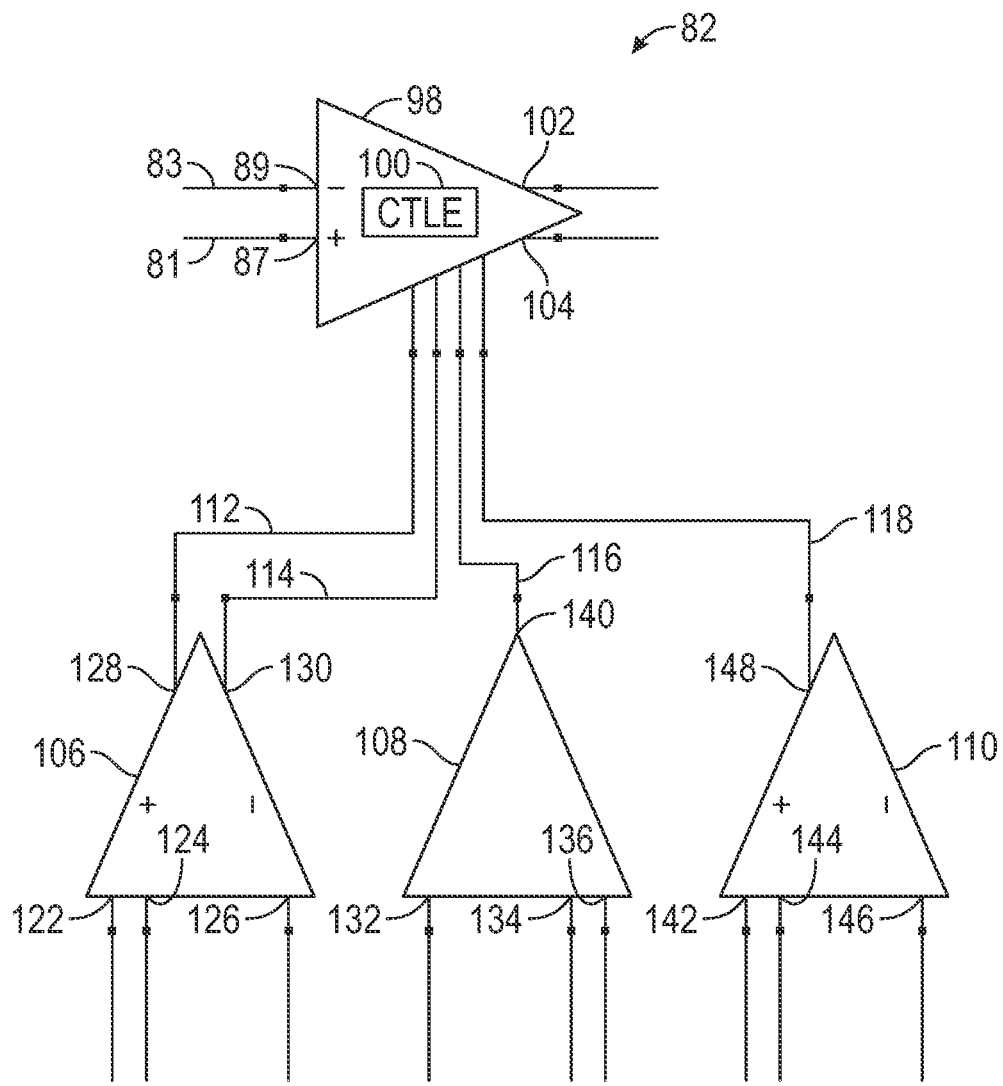
FIG. 6 illustrates a block diagram of a first embodiment of the amplifying device of FIG. 5 and associated correction circuitry, according to an embodiment of the present disclosure.

FIG. 6 illustrates an embodiment of the amplifying device 82 inclusive of a variable gain amplifier 98. Also illustrated as part of the amplifying device 82 is a CTLE circuit 100. For illustrative ease, the CTLE circuit 100 is illustrated internal to the variable gain amplifier 98 (i.e., integrated into the variable gain amplifier 98); however, it should be noted that the CTLE circuit 100 can instead, for example, be disposed separately from (i.e., in series with) the variable gain amplifier 98. As illustrated, the variable gain amplifier 98 includes input 87 that receives data bits and input 89 that receives a reference signal (e.g., the DQ reference signal 83 or "Vref") as well as output 102 that receives and transmits the amplified result from the variable gain amplifier 98 and output 104 that receives and transmits the compliment (e.g., inverted) amplified result from the variable gain amplifier 98. In some embodiments, the variable gain amplifier 98 may include additional inputs that receive signals utilized in the operation of the variable gain amplifier 98 and/or the CTLE circuit 100. These operational signals may include one or more of, for example, gain increment signal(s) (e.g., active high and/or active low), an AC peaking control signal, an input offset-correction trim signal, a signal as a boost of the DC gain through the CTLE circuit 100, a disable signal for the CTLE circuit 100, predetermined voltage signal from, for example, a tap of a resistor string digital to analog converter, and active high and/or active low enable signals. Additionally, as illustrated, the variable gain amplifier 98 can be coupled to one or more compensation circuits.

FIG. 6 additionally illustrates examples of the one or more compensation circuits as an output common-mode correction circuit 106, a temperature range correction circuit 108, and a VDDQ supply level correction circuit 110 as the one or more compensation circuits. In operation, the common-mode correction circuit 106 operates to compensate for deviations from an expected output common-mode of the variable gain amplifier 98. The temperature range correction circuit 108 operates to compensate for deviations in the outputs of the variable gain amplifier 98 due to temperature effects. The VDDQ supply level correction circuit 110 operates to compensate for deviations in the supply power voltage used to, for example, drive the load applied to DQ pins (e.g., DQ connector 50). The correction (e.g., compensation) values generated by the output common-mode correction circuit 106, the temperature range correction circuit 108, and the VDDQ supply level correction circuit 110 can be supplied to the variable gain amplifier 98 along paths 112, 114, 116, and 118, respectively.

As illustrated, the output common-mode correction circuit 106 includes an input 122, an input 124, and an input 126. Input 122 can be an enable input and can receive, for example, an activation signal to activate the output common-mode correction circuit 106. The output common-mode correction circuit 106 can be set or otherwise configured to be activated via either an active high signal (e.g., "1") or an active low signal (e.g., "0"). Input 124 of the output common-mode correction circuit 106 can receive an input reference voltage (e.g., VRDQ) as a baseline reference voltage. This reference voltage can be, for example, the DQ reference signal 83 discussed above as also transmitted to input 89 of the variable gain amplifier 98. In some embodiments, the input reference voltage may be between approximately 350 mV to 0.95*VDDQ (i.e., 95% of the source voltage supplied to the memory device 10). In some embodiments, VDDQ (i.e., the supply voltage) may be approximately 1.1V and/or may vary, for example, between two voltage values, such as approximately between 1.067V to 1.77V.

Input 126 of the output common-mode correction circuit 106 of FIG. 6 can represent one or more inputs that each receive a set voltage. This set voltage may be generated, for example, by a digital to analog converter (DAC) and, more specifically, a multi-tap resistor string DAC that generates a predetermined number of voltages. In one embodiment, the DAC can be a 32 level DAC (i.e., capable of providing 32 distinct voltages from the taps of the DAC). One or more of these voltages from respective taps of the multi-tap resistor string DAC can be transmitted to the input 126 (i.e., a selected one of the voltage levels can be transmitted to the output common-mode correction circuit 106 at input 126 or input 126 may represent two or more inputs that each receive a respective voltage, for example, from the respective taps of the multi-tap resistor string DAC.

When a multi-tap resistor string DAC is employed, the tap voltages can be set to predetermined levels between a high voltage level (e.g., VDDQ as the supply voltage) and low voltage level (e.g., ground). In one embodiment, as the supply voltage (e.g., VDDQ) varies, the DAC tap levels vary in correspondence with the variations of the supply voltage in a known manner (i.e., in response to the fixed resistor levels associated with each tap). In this manner, the DAC does not provide fixed voltages; rather it provides predetermined voltages at each tap that correspond to the supply voltage (i.e., tap voltages that vary in a predetermined manner as the supply voltage varies). The voltages generated by the multi-tap resistor string DAC may be used in the compensation circuits (e.g., one or more of the output common-mode correction circuit 106, the temperature range correction circuit 108, and the VDDQ supply level correction circuit 110) as VDDQ scaled voltage references. However, it should be noted that alternate techniques to generate these voltages may be undertaken.

The output common-mode correction circuit 106 can also include output 128 and output 130. Output 128 can transmit an output signal generated by the output common-mode correction circuit 106 along the path 112. This output signal transmitted along path 112 can be utilized to scale up an additive common-mode current progressively in conjunction with increasing voltage levels for VRDQ to mitigate drooping in the output common-mode level as VRDQ goes to the higher end of the specification range for VRDQ voltage values (e.g., VRDQ voltage levels allowed by the operating parameters for the memory device 10). Similarly, as illustrated, output 130 can transmit an output signal generated by the common-mode correction circuit 106 along path 114. This output signal transmitted along path 114 can be a boost bias signal utilized to scale up an additive differential tail current progressively with higher VRDQ to mitigate drop in the DC gain of the variable gain amplifier 98 as VRDQ goes to the higher end of the specification range for VRDQ voltage values.

The temperature range correction circuit 108 of FIG. 6, as illustrated, includes an input 132, an input 134, and an input 136. Input 132 of the temperature range correction circuit 108 can receive an input reference voltage (e.g., VRDQ) as a baseline reference voltage. This reference voltage can be, for example, the DQ reference signal 83 discussed above as also transmitted to input 89 of the variable gain amplifier 98 and to input 124 of the output common-mode correction circuit 106.

Input 134 of the temperature range correction circuit 108 can receive a signal as a gain increment. This signal can be, for example, an active high thermometer-encoded gain increment such that, for example, when all of the gain increments are zero, the DC gain (e.g., of the temperature range correction circuit 108) is set to a particular value (e.g., −6 dB). If a first gain increment (e.g., GN2) is set to high and all other gain increments are set to zero then, the gain is a set amount (e.g., +2 dB) above the minimum (e.g., −6 dB), generating a resultant gain (e.g., −4 dB). As temperature values increase, the increments can continue to increase. For example, if the first increment (e.g., GN2) and the second increment (e.g., GN4) are set to high and all other gain increments are set to zero, then the gain is a set amount (e.g., +2 dB +2 dB for a total of +4 dB) above the minimum (e.g., −6 dB), generating a new resultant gain (e.g., −2 dB). This can continue until all of the bits reflective of the gain increments are set to high and a total amount of gain (e.g., +12 dB) above the minimum (−6 dB) is set as the new resultant gain (e.g., +6 dB). These set values for the minimum and the gain increments can be predetermined values that can tailored to the respective memory device 10. Thus, the gain minimum (−6 dB) and maximum (+6 dB) of the received input signal and, for example, the gain increments (i.e., resolution or levels of change in the gain) for the variable gain amplifier 98 can be specified by the type of memory device employed (e.g., DDR5).

Input 136 of the temperature range correction circuit 108 can be an enable input and can receive, for example, an activation signal to activate the temperature range correction circuit 108. The temperature range correction circuit 108 can be set or otherwise configured to be activated via either an active high signal (e.g., "1") or an active low signal (e.g., "0"). In some embodiments, the enable input received at input 136 of the of the temperature range correction circuit 108 is the same signal as received at input 122 of the output common-mode correction circuit 106.

The temperature range correction circuit 108 also includes output 140. Output 140 can transmit an output signal generated by the temperature range correction circuit 108 along the path 116. This output signal transmitted along path 116 can be utilized generally as a variable current source injected into, for example, a common source node of the variable gain amplifier 98. When this signal is input to the variable gain amplifier 98, it provides scaling up of the current as temperature drops (i.e. a complimentary to absolute temperature or "CTAT") to compensate for the higher transconductance (i.e., gm) of, for example, the circuitry of and/or portions of the variable gain amplifier 98 at lower temperature. Without compensation, the DC gain of the variable gain amplifier 98 (e.g., the proportional input gm) could rise prohibitively. In operation, the higher current provided from output 140 is injected, for example, into tail devices of the variable gain amplifier 98, resulting in less current being provided differentially across the input stages of the variable gain amplifier 98. In summary this current provided from output 140 operates to mitigate DC gain variation across the operating temperature range for the variable gain amplifier 98.

The VDDQ supply level correction circuit 110 of FIG. 6, as illustrated, includes an input 142, an input 144, and an input 146. Input 142 of the VDDQ supply level correction circuit 110 can be an enable input and can receive, for example, an activation signal to activate the VDDQ supply level correction circuit 110. The VDDQ supply level correction circuit 110 can be set or otherwise configured to be activated via either an active high signal (e.g., "1") or an active low signal (e.g., "0"). In some embodiments, the enable input received at input 142 of the of the VDDQ supply level correction circuit 110 is the same signal as received at input 122 of the output common-mode correction circuit 106 and/or input 136 of the of the temperature range correction circuit 108.

Input 144 of the VDDQ supply level correction circuit 110 can represent one or more inputs that each receive a set voltage. This set voltage may be generated, for example, by a digital to analog converter (DAC) and, more specifically, the multi-tap resistor string DAC that generates a predetermined number of voltages described above with respect to the output common-mode correction circuit 106. In some embodiments, the signal received at input 144 may have the same voltage as the signal received at input 126 (i.e., a voltage from a respective tap of the multi-tap resistor string DAC that is transmitted to both the input 126 of the output common-mode correction circuit 106 and the input 144 of the VDDQ supply level correction circuit 110). In other embodiments, the signal received at input 144 may have a different voltage from any signal(s) received at input 126.

The VDDQ supply level correction circuit 110 also can include input 146. Input 146 can receive, for example, a voltage reference input voltage as a reference voltage used in a comparison by the VDDQ supply level correction circuit 110 against a predetermined fraction of the VDDQ voltage. This allows for a supply-level compensation to occur based on the comparison. In some embodiments, the predetermined fraction of the VDDQ voltage may be a set percentage or may be a set voltage level, for example, approximately 800 mV.

The VDDQ supply level correction circuit 110 also includes output 148. Output 148 can transmit an output signal generated by the VDDQ supply level correction circuit 110 along the path 118. This output signal transmitted along path 118 can be utilized generally as a variable current source and can be injected into the common source of a replica circuit of the variable gain amplifier 98. This input current to the variable gain amplifier 98 scales up as the supply voltage increases to compensate for higher levels of self-bias-based tail current reference levels with higher voltage. Without compensation, the DC gain of the variable gain amplifier 98 (proportional to a reference tail current thereof) would rise prohibitively from the minimum VDDQ supply level (e.g., approximately 1.067V) to the maximum VDDQ supply level (e.g., approximately 1.177V). As higher current is injected into replica tail devices of the variable gain amplifier 98 (based on the signal transmitted from output 148) in conjunction with a VDDQ supply-level increase, the overall tail bias into the variable gain amplifier 98 is held at (or close to) a constant mitigating DC gain despite any variation with supply voltage changes.

Figure 7:
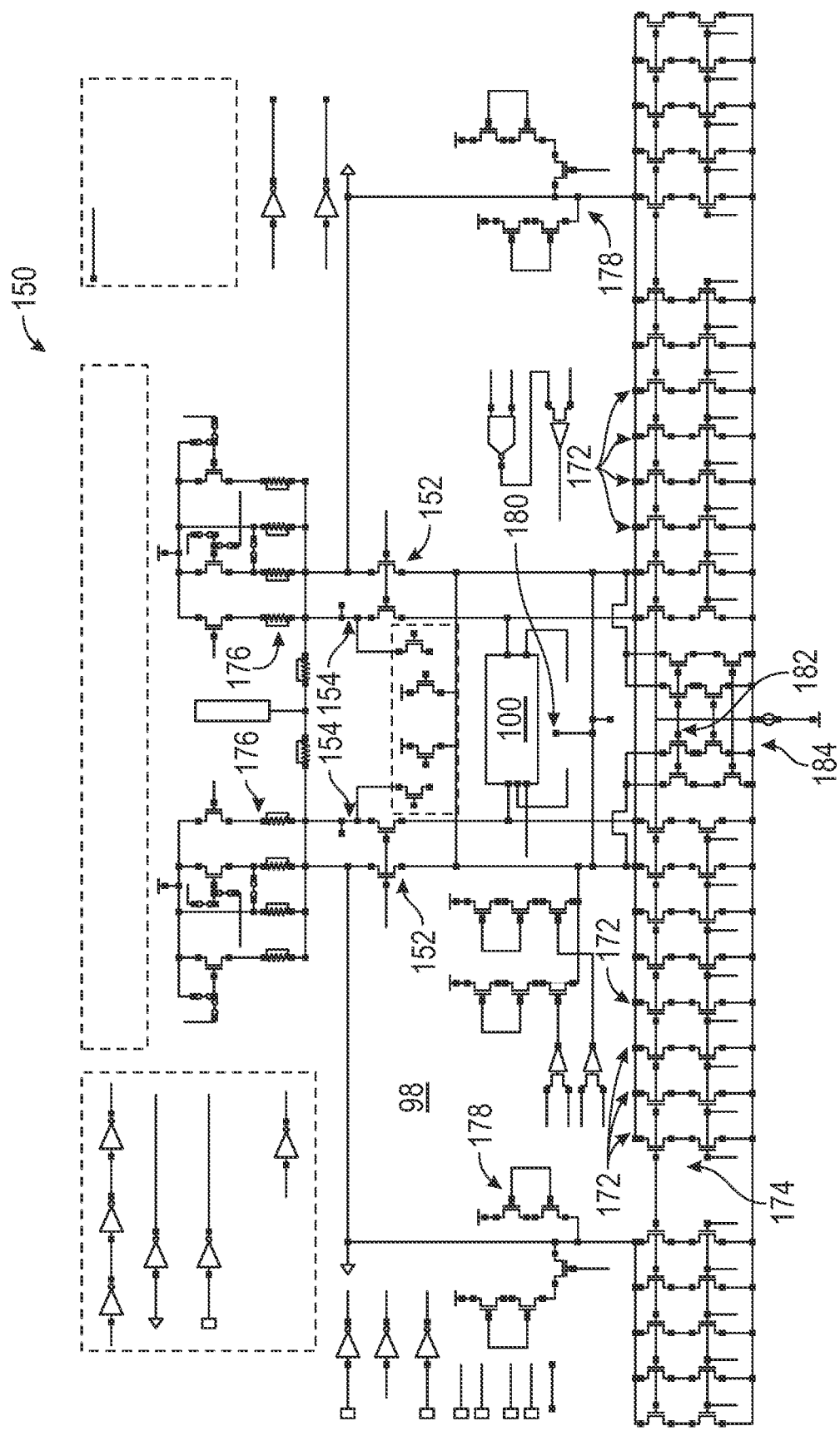
FIG. 7 illustrates a circuit diagram of the first embodiment of the amplifying device of FIG. 5, according to an embodiment of the present disclosure.
Figure 7:
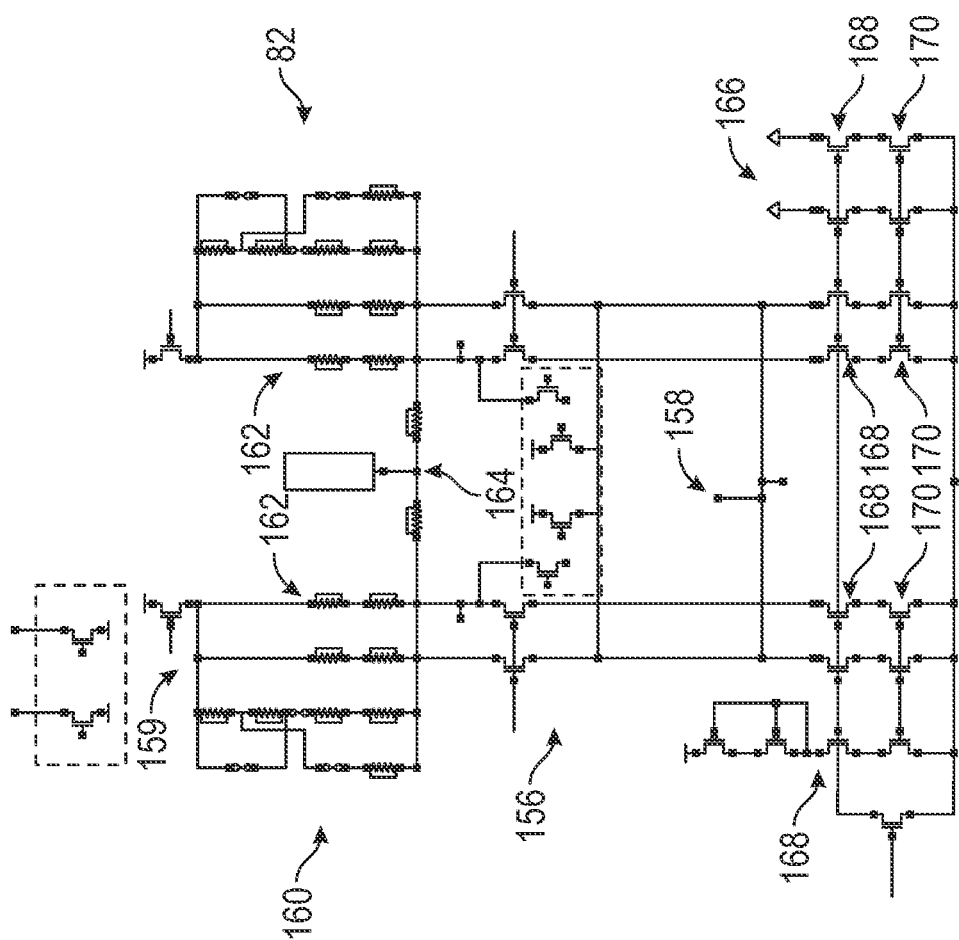

FIG. 7 illustrates an example of the amplifying device 82 inclusive of a variable gain amplifier 98 and the CTLE circuit 100 that utilizes the output signals transmitted along paths 112, 114, 116, and 118. As illustrated, the variable gain amplifier 98 is an N-type amplifier (e.g., Namp) 150 that utilizes N-type transistors. As illustrated, the Namp 150 includes a DC input stage 152 (inclusive of its respective transistors) that is separate from (e.g., parallel to) an AC input stage 154 (inclusive of its respective transistors). As the CTLE circuit 100 operates as boost circuitry (e.g., to boost higher frequency content therefore making it effectively equivalent to amplitude at lower frequency components of the data stream), it is coupled to the AC input stage 154 as an input.

Additionally, the variable gain amplifier 98 includes a replica circuit 156 that can be utilized, for example, to provide a biasing level for the Namp 150. In this manner, the replica circuit 156 operates to set the Namp 150 biasing. The replica circuit 156 can operate as a self-bias generation circuit, such that the bias provided to the Namp 150 is generated in the replica circuit 156 (i.e., using a mirror). In some embodiments, the replica circuit 156 replicates portions of the Namp 150, which provides, for example, matching to a first order with the replicated portions of the Namp 150.

With respect to providing a biasing level for the Namp, in some embodiments, the replica circuit 156 may be utilized to set up a bias point. This in in contrast to other designs of the Namp 150, where self-biasing is generated within the actual active high speed amplifier (e.g., the Namp 150) itself. Potential advantages to generating the bias in the replica circuit 156 include more readily maintaining linearity and accuracy in DC gain compensation across the full range of DC gain selection points.

As illustrated in FIG. 7, the replica circuit 156 includes the supply level correction point 158. The supply level correction point 158 may be an input that receives current to be injected into the replica circuit 156 to compensate for rising supply voltage (e.g., where the supply voltage, VDDQ, can be received at input 159 of the replica circuit). In some embodiments, the supply level correction point 158 can be coupled to the path 118 to receive the output signal generated by the VDDQ supply level correction circuit 110. That is, the supply level correction point 158 receives current that is injected into the replica circuit 156 to augments the current transmitted to into a high side 160 of the replica circuit 156. More specifically, the current received at the supply level correction point 158 increases the amount of current transmitted across the resistors 162 (e.g., load resistors) of the high side 160 of the replica circuit 156. This leads to a less effective voltage drop against the resistors 162 in the high side 160 of the replica circuit 156, which causes the common-mode point (CMP) 164 between the resistors 162 to be at an effectively lower incremental voltage. The voltage drop across the resistors 162 drives tail devices, for example, transistors 168 (i.e., field effect transistors), in the low side 166 of the replica circuit 156. The low side 166 of the replica circuit 156 can also include enable devices (e.g., transistors 170) coupled to the tail devices.

The tail devices (e.g., transistors 168) may be directly tied to (i.e., coupled to) the CMP 164 and the tail devices can operate to set a current (i.e., setting of the bias of the variable gain amplifier 98). In this manner, the CMP 164 generates the bias on the tail devices. The bias on the tail devices allows for the self-biasing generation in the replica circuit 156. For example, there is a voltage at the CMP 164 that is provided to the tail devices of the low side 166 of the replica circuit 156. If, for example, the supply voltage is altered causing the resistors 162 to pull a voltage below a rail value, the voltage at the CMP 164 is reduced. This can cause the strength of the transistors 168 as the tail devices being "on" to be reduced. Likewise, for example, if the supply voltage is altered causing the resistors 162 to pull a voltage near the rail value (causing a reduction in current), the strength of the transistors 168 as the tail devices being "on" is high.

By introducing current via the supply level correction point 158, the strength of the transistors 168 being "on" can be made to be consistent, i.e., to correct for changes in supply voltage levels. Thus, by introducing the supply level correction point 158 and by selectively providing current therefrom, the amount of current via the pulled via the transistors 168 given fixed resistors 162 can be equalized despite supply voltage fluctuations. This provides a consistent gain for the replica circuit 156 independent of the level of the supply voltage. Moreover, as the voltage across the tail devices of the low side 166 of the replica circuit 156 is the voltage across the tail devices (e.g., transistors 172) of the Namp 150, by normalizing the amount of current pulled via the transistors 168, the biasing of the Namp 150 is normalized (i.e., set at a consistent level regardless of changes to the level of the supply voltage).

Additionally, it should be noted that the gain may be fixed in the replica circuit 156, thus allowing simple relative gain adjustments in the Namp 150 by scaling DC stage tail currents. That is, gain adjustments in the Namp 150 can be performed by the gain increments discussed above. For example, set values for the minimum and the gain increments can be predetermined values that can tailored to the respective memory device 10. Thus, the gain minimum (−6 dB) and maximum (+6 dB) and, for example, the gain increments (i.e., resolution or levels of change in the gain) for the variable gain amplifier 98 can be specified by the type of memory device employed (e.g., DDR5). The gain adjustments for the variable gain amplifier 98 may be selected by changing the number of current mirror fingers 174 that are pulling current across the resistors 176 (e.g., load resistors). For example, a greater number of current mirror fingers 174 that are activated results in a greater gain for the variable gain amplifier 98, while a fewer number of current mirror fingers 174 that are activated results in a lower gain for the variable gain amplifier 98. Additionally, for the maximum gain, the load resistance may be switched from the resistors 176 to a different effective resistance (e.g., twice the resistance of the resistors 176) in conjunction to implement current mode logic resistance to allow for, for example, 1 dB compression point frequency across gains.

Additionally, it should be noted that the Namp 150 provides first order output common-mode consistency that is maintained across different gains. This may be accomplished by scaling common-mode shift currents across gains. However, this differs from correction of the common-mode, which will be discussed in greater detail herein as additionally (in addition the first order consistency discussed above) correction (e.g., non-linear correction) is made that facilitates a matched output common-mode. Output common-mode compensation generally relates to changes in the reference voltage (i.e., a signal swinging around the reference voltage, VRDQ). The DFE 70 is sensitive to VRDQ levels and the Namp 150 of FIG. 7 can allow for different VRDQ levels while constraining its common-mode point very tightly, which is helpful to the DFE 70, since errors can occur when the input common-mode to the DFE 70 varies (i.e., when the common-mode is difficult to tune in). This constraint of the common-mode may be accomplished using a common-mode correction point 178, as illustrated in FIG. 7.

The common-mode correction point 178 may be an analog circuit (e.g., two transistors in series) that is driven by a voltage reference (e.g., a tail Vref) that is generated by the common-mode correction circuit 106. In some embodiments, the common-mode correction point 178 can be coupled to the path 112 to receive the output signal generated by the output common-mode correction circuit 106. The common-mode correction point 178 may be a mirrored device (e.g., a mirror) of the current that is generated from the common-mode correction circuit 106. That is the currents output from the common-mode correction circuit 106 are mirrored by the common-mode correction point 178 as an additive common-mode correction to the first order common-mode consistency discussed above.

FIG. 7 additionally illustrates a temperature correction point 180. In some embodiments, the temperature correction point 180 can be coupled to the path 116 to receive the output signal generated by the temperature range correction circuit 108. Temperature variation during operation of the memory device 10 may affect various components of the variable gain amplifier 98. For example, the gm of the input stage transistors 152 of the Namp 150 are significantly affected by temperature changes during operation. Accordingly, the Namp 150 includes the temperature correction point 180 to correct for the change in gm of the transistors 152 that would otherwise occur due to temperature variations. The typical trend for a MOS transistor is an inverse change in gm level with temperature. For example, to correct for this condition, the Namp 150 may have Ids current increase through the DC input stage (e.g., the transistors 152) as temperature rises to counteract the falling gm of the transistors 152.

To correct for gm reduction of transistors 152 with temperature rise, the amount of current sourced from temperature correction circuit 214 (i.e. current provided to the drains of transistors 172 that subtracts from the tail current generated by transistors 172 whose difference current is pulled through DC input stage transistors 152) is effectively reduced as the temperatures increase (i.e., the amount of tail current directly pulled through transistors 152 increases as the temperatures increase to offset the effect of lowering gm on transistors 152) utilizing the temperature correction current sourced to node 180 from temperature correction circuit 214. The Gm of transistors 152 is inversely related to temperature (i.e., gm increases as temperature is reduced and gm is reduced as temperatures increase). Therefore, without temperature correction, there is greater differential output gain at lower temperatures. However, differences in gain in the variable gain amplifier 92 are not desirable and, accordingly, current is injected via the temperature correction point 180 coupled to the transistors 172. As temperatures drops, an increased amount of current is injected via the temperature correction point 180 and transmitted to the drain of the tail devices, transistors 172, resulting in lowered common source current provided to the differential input stage (e.g., transistors 152). Since the gm of the input stage (i.e. amount of change in differential current with change in differential voltage) increases ideally in inverse proportion to the lowered common-source current into transistors 152, the amount of differential current across load resistors 176 is maintained preserving consistent amplifier gain across temperature.

Furthermore, the Namp 150 can include a boost input 182. As illustrated, the boost input 182 may be coupled to one or more of the transistors 184 of the Namp 150 (e.g., between the gates of the upper transistors of the transistors 184 and between the gates of the lower transistors, i.e., the specific enable transistors, of the transistors 184 and the boost input 182 can receive the output signal generated by the common-mode correction circuit 106 along path 114. As previously noted, this output signal transmitted along path 114 can be a boost bias signal utilized to scale up an additive differential tail current progressively with higher VRDQ to mitigate drop in the DC gain of the variable gain amplifier 98 as VRDQ goes to the higher end of the specification range for VRDQ voltage values. As the VRDQ approaches the supply voltage, gm begins to be reduced. To correct for this, as the VRDQ voltage level increases, the amount of tail current should be increased. Accordingly, the current can be increased by injecting current via the boost input 182, whereby the amount of current increases in conjunction with increases to the VRDQ voltage level.

Figure 8:
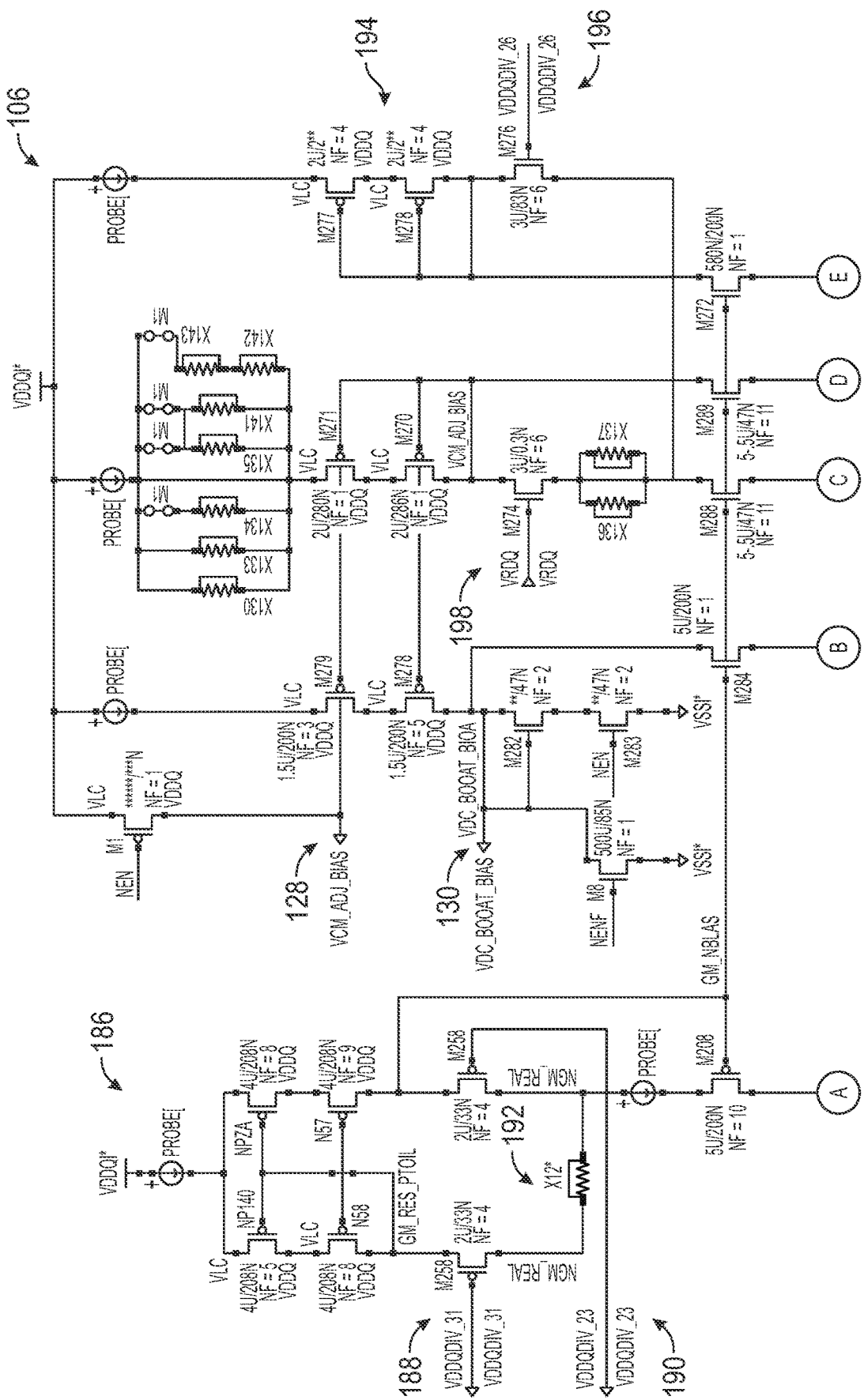
FIG. 8 illustrates a circuit diagram of an embodiment of the common-mode correction circuit of FIG. 5, according to an embodiment of the present disclosure.
Figure 8:
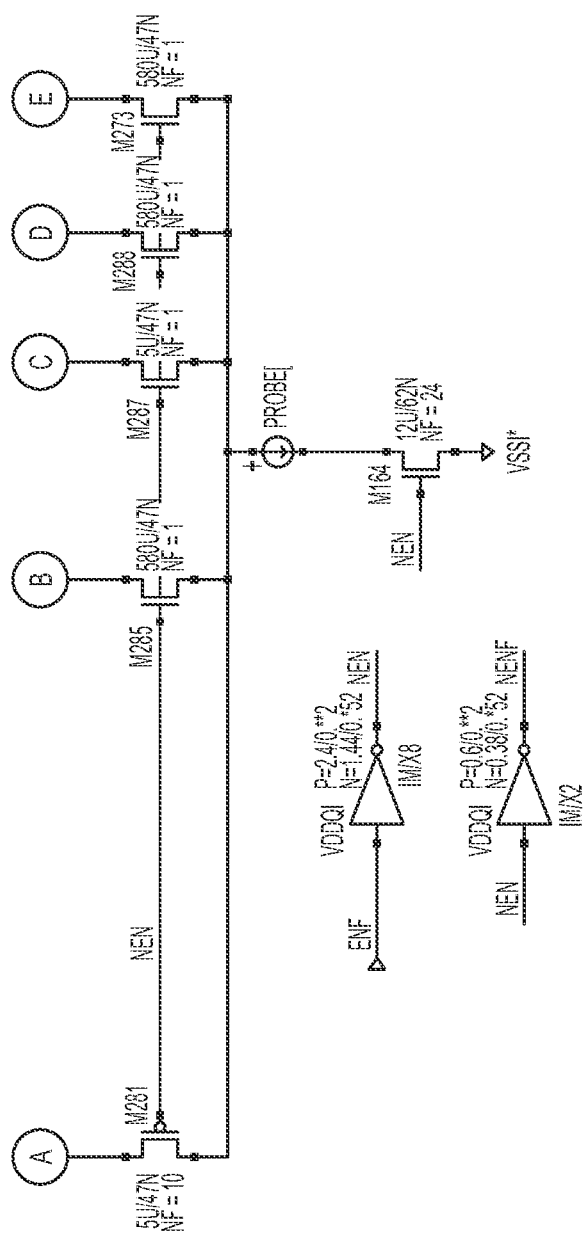

FIG. 8 illustrates an embodiment of the output common-mode correction circuit 106. It should be noted that the particular circuitry of the output common-mode correction circuit 106 is provided as an example only. Generally, the output common-mode correction circuit 106 operates to convert voltage(s) to current(s). As illustrated, the output common-mode correction circuit 106 includes a bias generation circuit 186. The bias generation circuit 186 may operate, for example, to generate a bias current based on two DAC tap voltages across a resistor 192, whereby one DAC tap voltage is transmitted along path 188 (as received from an input 126 of the output common-mode correction circuit 106) and a second DAC tap voltage is transmitted along path 190 (as received from another input 126 of the output common-mode correction circuit 106). Essentially, a current is set based upon the difference between the DAC tap voltages on path 188 and path 190, each of which may be selected as a predetermined DAC tap voltage (i.e., a particular tap location for each tap voltage). This establishes a self-biasing circuit as the bias generation circuit 186 with tap voltages that change in conjunction with changes in the supply voltage. Furthermore, it should be noted that the DAC tap point selection may be part of process trim for trimming reference current (effectively, a common-mode correction gain trim).

The illustrated output common-mode correction circuit 106 also includes comparison circuitry 194. The comparison circuitry 194 compares a resistor string DAC tap voltage transmitted along path 196 (as received from an input 126 of the output common-mode correction circuit 106) with a VRDQ (i.e., the input reference voltage) transmitted along path 198 (as received from an input 124 of the output common-mode correction circuit 106). As the VRDQ voltage increases, there is a need to inject current to raise the common-mode (i.e., via the common-mode correction point 178). The comparison circuitry 194 portion of the output common-mode correction circuit 106 allows for tracking of the rise of the VRDQ voltage (based the result of the comparison with the resistor string DAC tap voltage transmitted along path 196). Thus, as VRDQ voltage levels go above the DAC tap voltage transmitted along path 196, the output common-mode correction circuit 106 progressively creates higher levels of common-mode correction current. Additionally, the DAC tap voltage transmitted along path 196 may be a different DAC tap point for purposes of process trim (effectively, a common-mode correction offset trim). Thus, in operation, the common-mode correction is useful to offset higher VRDQ levels to, for example, flatten a respective desired region of the VRDQ range output commode mode voltage levels.

Figure 9:
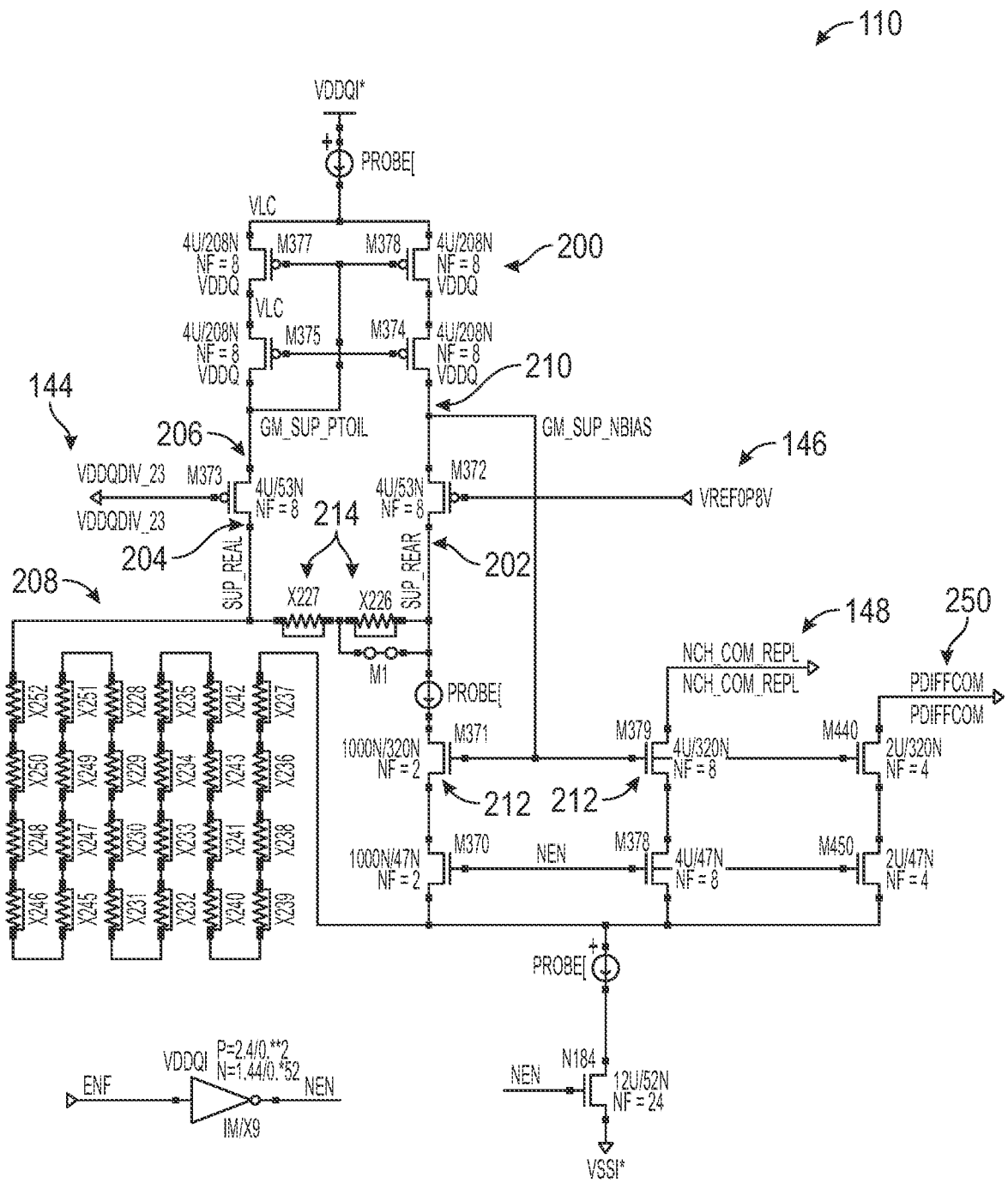
FIG. 9 illustrates a circuit diagram of an embodiment of the supply level correction circuit of FIG. 5, according to an embodiment of the present disclosure.

FIG. 9 illustrates an embodiment of the VDDQ supply level correction circuit 110 that operates generally to convert voltage to current (transmitted via output 148). It should be noted that the particular circuitry of the VDDQ supply level correction circuit 110 is provided as an example only. As illustrated, the VDDQ supply level correction circuit 110 includes input 144 that receives at least one DAC tap voltage, input 146 that receives a voltage reference input voltage as a reference voltage used in a comparison by the VDDQ supply level correction circuit 110 against a predetermined fraction of the VDDQ voltage, and output 148, which can transmit an output signal generated by the VDDQ supply level correction circuit 110 along the path 118 to be utilized as a variable current source and injected into the common source of the replica circuit 156 of the variable gain amplifier 98.

In operation, the VDDQ supply level correction circuit 110 includes comparison circuitry 200 that operates to compare the resistor string DAC tap voltage received from input 144 with the voltage reference input voltage received at input 146. If the voltage supply is low, a greater amount of the current passing through the comparison circuitry 200 will pass thorough path 202 of the comparison circuitry 200 relative to path 204 of the comparison circuitry 200. Accordingly, to maintain a bias point for transistor 206, resistor string 208 may be utilized.

As the DAC tap voltage received from input 144 moves to a higher voltage (based on its generation from the supply voltage and its voltage increasing, i.e., the DAC tap voltage scales linearly with VDDQ), there will be an increased mirroring current on path 204, which causes the voltage at point 210 to increase. This, in turn, activates the transistors 212 as negative feedback. Accordingly, at higher voltage levels for the supply voltage, there is more current provided to the output 148 (based on the activation of the transistors 212) and delivered thereafter to the supply level correction point 158. It should also be noted that the VDDQ supply level correction circuit 110 can also include resistors that operate to set the curvature of the supply level correction transmitted from output 148.

Figure 10:
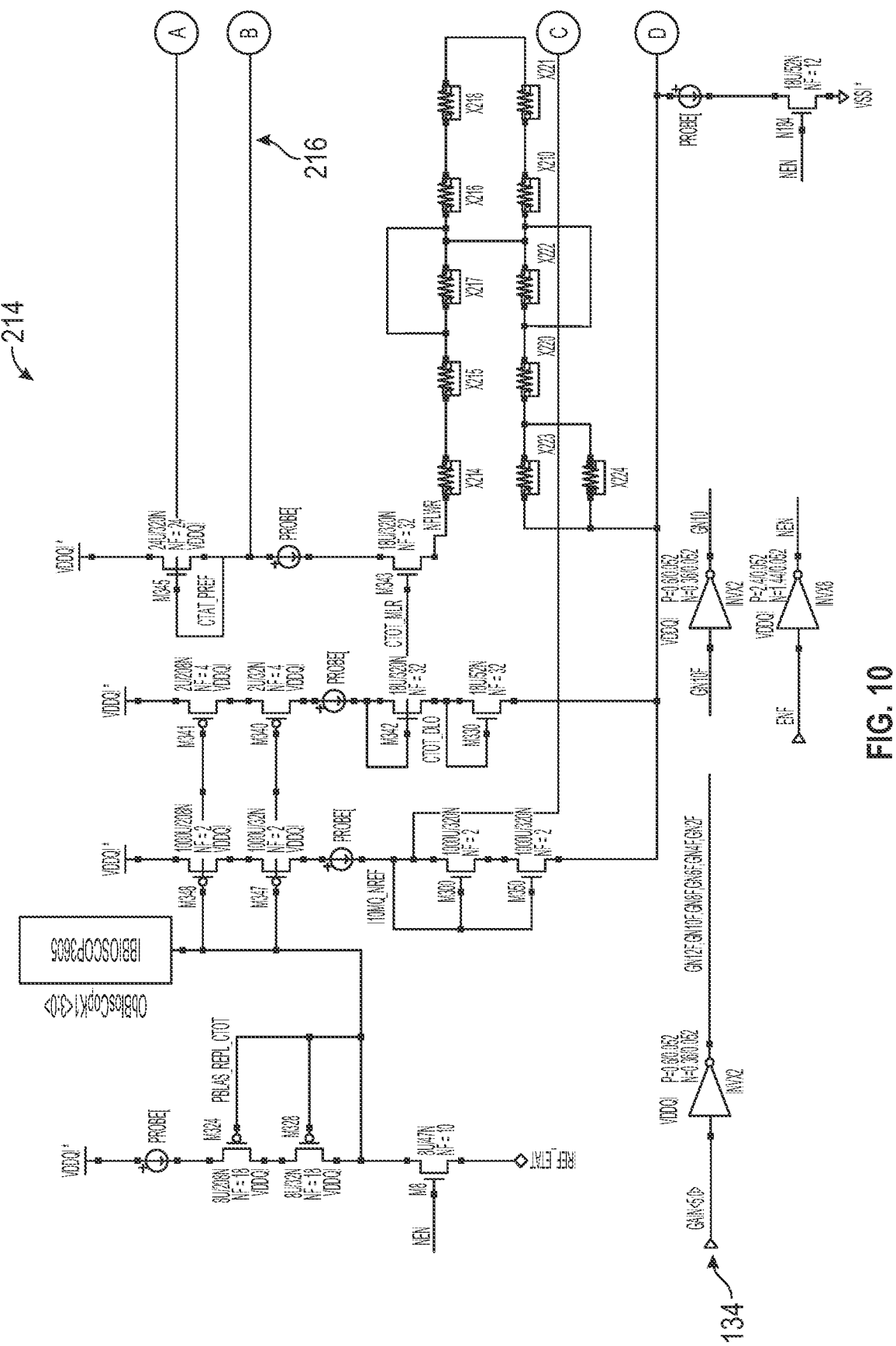
FIG. 10 illustrates a circuit diagram of an embodiment of the temperature correction circuit of FIG. 5, according to an embodiment of the present disclosure.
Figure 10:
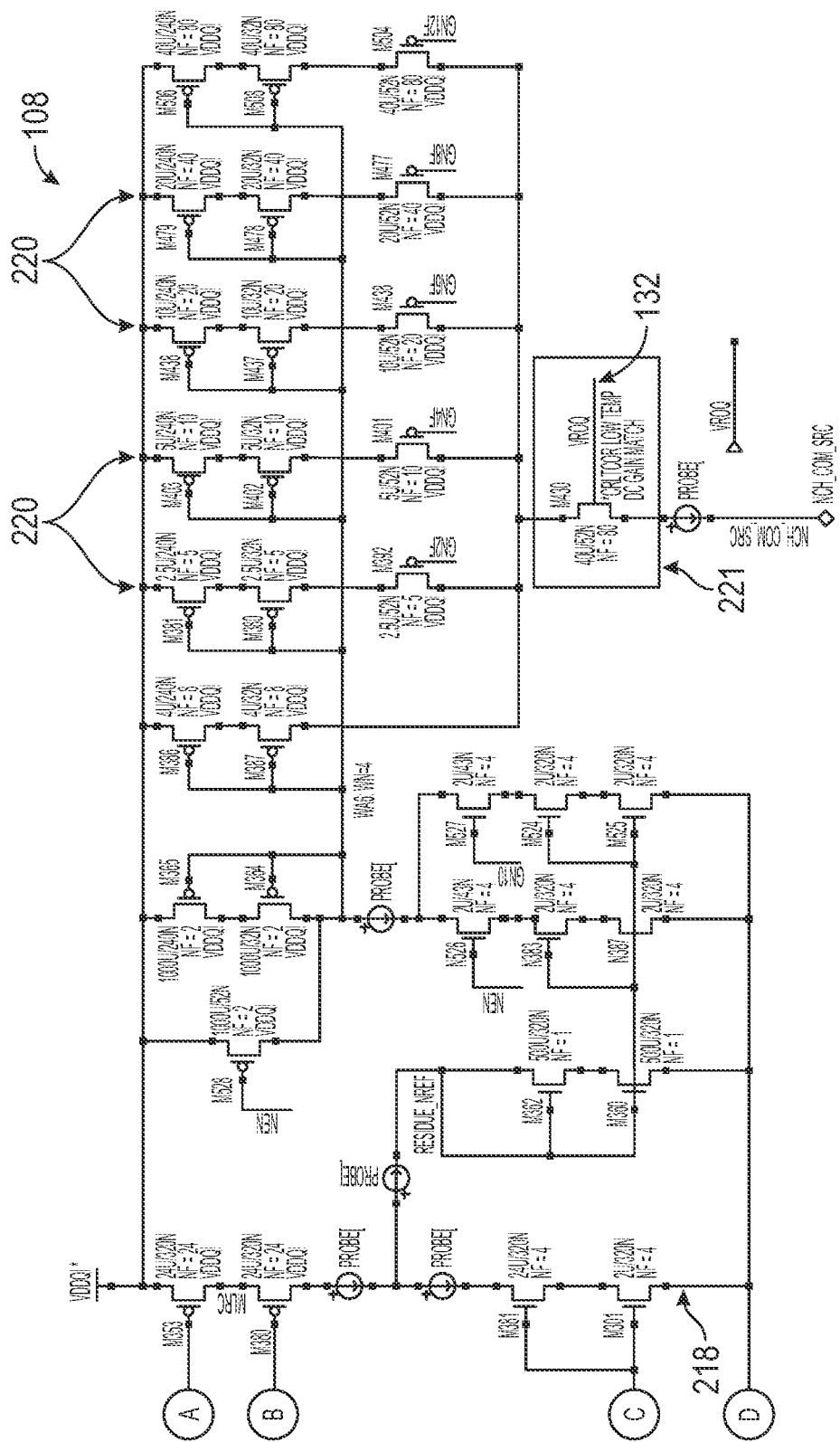

FIG. 10 illustrates an embodiment of the temperature range correction circuit 108. It should be noted that the particular circuitry of the temperature range correction circuit 108 is provided as an example only. The temperature range correction circuit 108 includes current generation circuitry 214. The current generated by the current generation circuitry 214 may be mirrored (and transmitted along path 216) that a mirrored copy of the input current source from path 218 can be subtracted from the current along path 216 to generate a residue current. This residue current is inversely related to temperature such that the residue current is smallest at high temperatures and increases as temperatures decrease.

This residue current may be scaled by the gain setting of the variable gain amplifier 98 (e.g., by the received gain level at input 134). The temperature range correction circuit 108 includes transistors 220 with gates tied to the reference voltage VRDQ as well as a transistor 222 that operates to squelch correction current into the Namp 150 sources at low VRDQ levels (i.e., temperature correction drops off at lower VRDQ voltage levels) in generating the output signal transmitted along path 116 to the temperature correction point 180.

Figure 11:
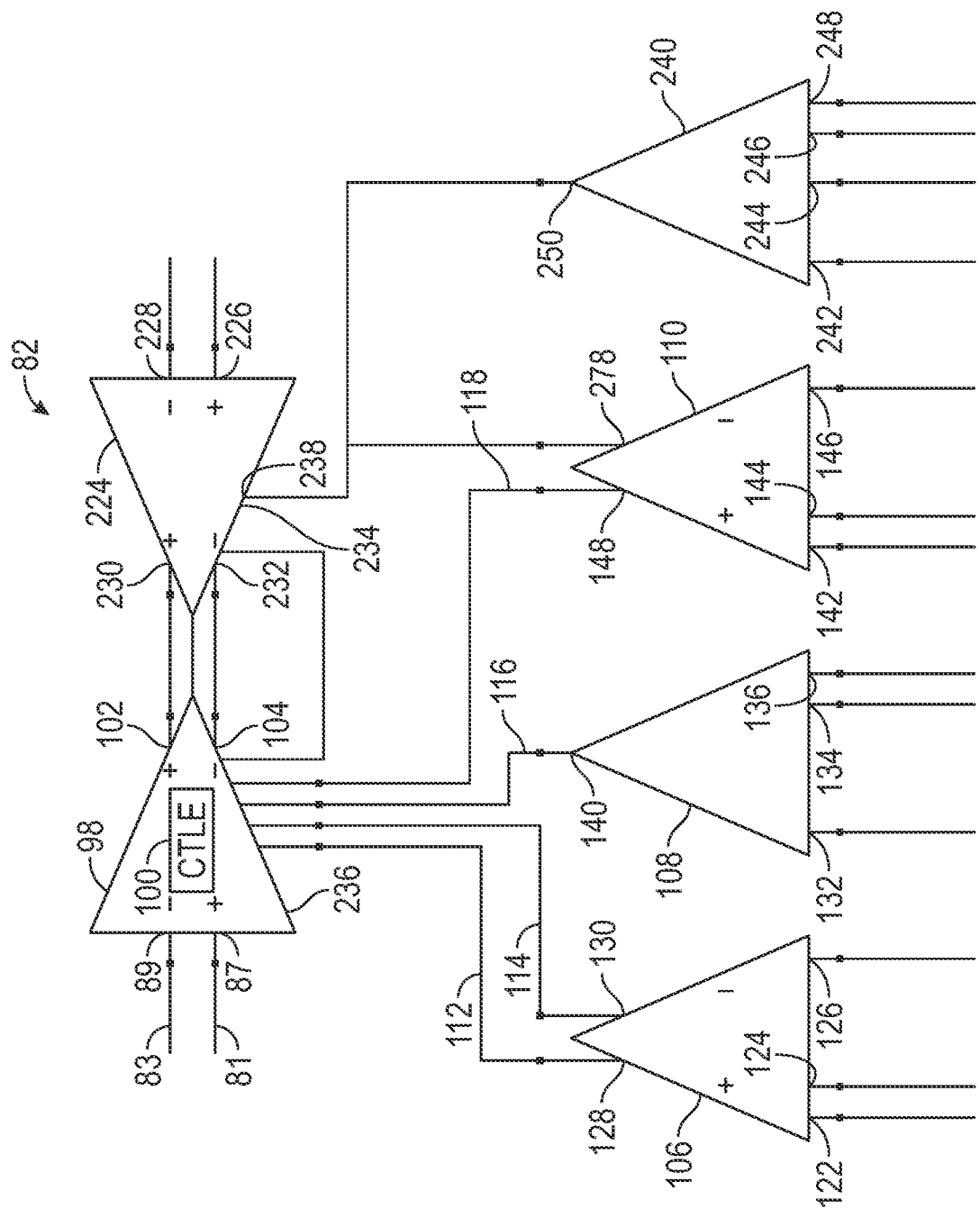
FIG. 11 illustrates a block diagram of a second embodiment of the amplifying device of FIG. 5 and associated correction circuitry, according to an embodiment of the present disclosure.

It should be noted that the amplifying device 82 of FIG. 5 may include alternate circuitry. FIG. 11 illustrates a block diagram of a second embodiment of the amplifying device 82. Similar to FIG. 5, the amplifying device 82 includes the variable gain amplifier 98 as Namp 150 inclusive of the CTLE circuit 100. However, the amplifying device 82 further includes Pamp 224 (i.e., a P-type amplifier circuit). The Pamp 224 may be a parallel amplifier that allows for high input common-mode range. Moreover, by including the Pamp 224 in the amplifying device 82, removal of a P-type amplifier from the DFE 70 may be accomplished.

When both the Namp 150 and the Pamp 224 are present, with a central VRDQ (e.g., a voltage reference of approximately 0.5V or 0.6V), both the Namp 150 and the Pamp 224 can be active (i.e., "on"), such that essentially the sum of the currents that the amps are supplying across their load resistors causes the gain of the amplifying device 82 to effectively increase. This causes VRDQ to move from low voltage (e.g., approximately 350 mV) to a high voltage (e.g., approximately 0.95*VDDQ), and associated gain increases accrue from the target gain level to approximately, for example, twice the target gain value 2× then back to target gain level as a gain curve.

As illustrated, the Pamp 224 includes input 226 that receives data bits and input 228 that receives a reference signal (e.g., the DQ reference signal 83 or "Vref") as well as output 230 that receives and transmits the amplified result from the Pamp 224 and output 232 that receives and transmits the compliment (e.g., inverted) amplified result from the Pamp 224.

The Pamp 224 can also include input 234 that is coupled to an output 236 of the variable gain amplifier 98. Output 236 may in operation transmit a signal (e.g., a current bias) to the Pamp block from, for example, the block replica circuit 156 of the variable gain amplifier 98. This signal may be the bias for the Pamp 224 for dc gain control and can be mirrored from of the replica circuit 156 of the variable gain amplifier 98 such that biases of the Pamp 224 and the biases of the Namp 150 are correlated, both basic current levels related and having supply correction in common.

Additionally, the Pamp 224 can include output 238, which can operate to transmit a variable current source sinking current (as will be discussed in greater detail below). Furthermore, in some embodiments, the Pamp 224 may include additional inputs that receive signals utilized in the operation of the Pamp 224. These operational signals may include one or more of, for example, gain increment signal(s) (active high and/or active low), an active high and/or active low enable signal, and an enable for an equalizer boost circuit of the Pamp 224.

FIG. 11 additionally illustrates examples of the one or more compensation circuits as the output common-mode correction circuit 106, the temperature range correction circuit 108, and the VDDQ supply level correction circuit 110 described above. In addition, another compensation circuit, a cross-over correction circuit 240 is illustrated. In operation, cross-over correction circuit 240 maintains gain flatness as the Namp 150 and Pamp 224 transition as the dominant receiver based on VRDQ level and respective transistor operating points. That is, the cross-over correction circuit 240 operates to flatten the center point of the gain curve (i.e., where the gain increases to, for example, twice the target gain) so that there is not gain peaking when both the Namp 150 and the Pamp 224 are on.

As illustrated, the cross-over correction circuit 240 includes an input 242, an input 244, an input 246, and an input 248. Input 242 can be an enable input and can receive, for example, an activation signal to activate the cross-over correction circuit 240. The cross-over correction circuit 240 can be set or otherwise configured to be activated via either an active high signal (e.g., "1") or an active low signal (e.g., "0"). Input 244 of the cross-over correction circuit 240 can receive an input reference voltage (e.g., VRDQ) as a baseline reference voltage. This reference voltage can be, for example, the DQ reference signal 83 discussed above as also transmitted to input 89 of the variable gain amplifier 98 and to input 228 of the Pamp 224.

Input 246 of the cross-over correction circuit 240 of FIG. 11 can receive a voltage DAC tap voltage that is variably selected (or otherwise based upon) gain. Additionally, input 248 of the cross-over correction circuit 240 of FIG. 11 can represent one or more inputs that each receive a set voltage. The set voltage may be generated, for example, by the DAC digital and may correspond to respective tap voltages, as previously described herein.

As an initial matter, it should be noted that present embodiments allow for bias matching across the Namp 150 and the Pamp 224 by using mirrored replica current for Pamp 224 bias current generation. That is, the low side 166 of the replica circuit 156 of FIG. 7 includes tail devices, such as transistors 168 and enable devices (e.g., transistors 170) coupled to the tail devices. These devices can be utilized not just to generate the bias for the Namp 150, but also the Pamp 224. This facilitates consistency in crossover between the Namp 150 and the Pamp 224 across all gains.

Figure 12:
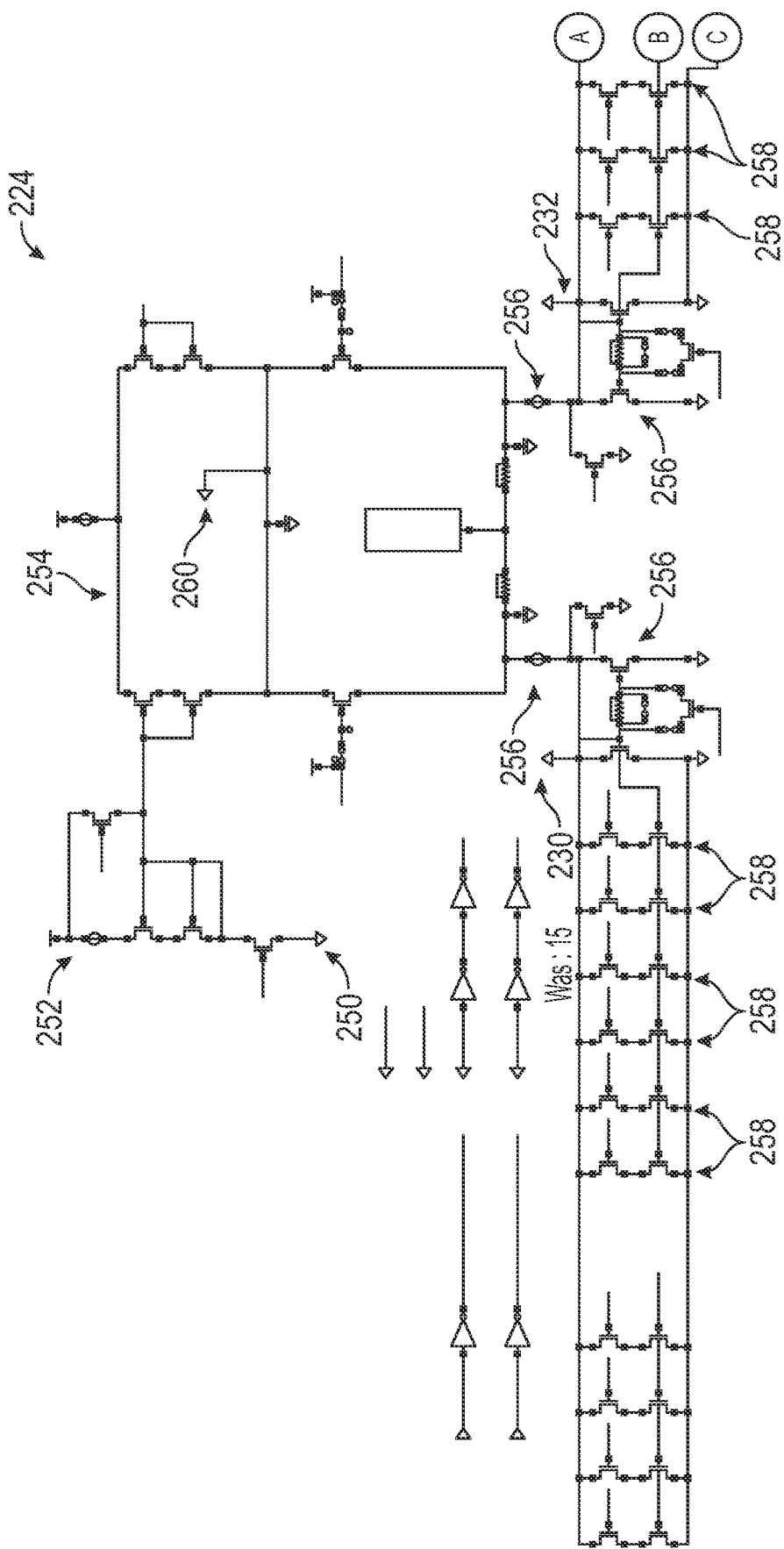
FIG. 12 illustrates a circuit diagram of the P-type amplifier of the second embodiment of the amplifying device of FIG. 11, according to an embodiment of the present disclosure.

With this in mind, FIG. 12 illustrates an embodiment of the Pamp 224. The Pamp 224 may include input 250 that is coupled to the replica circuit 156 to receive a mirrored replica current therefrom. The received current is mirrored though the mirroring circuitry 252 (inclusive of P-type transistors) and transmitted as the current for the Pamp 224 along path 254. As illustrated, the Pamp 224 has a diode mirror topology. Thus, in place of a resistive load (as found in the Namp 150 previously discussed), the Pamp 224 utilizes diodes 256. These diodes are coupled to mirrored fingers 258 that are added as gain of the Pamp 224 increases. The outputs 230 and 232 transmit the resultant currents.

Cross-over can occur when both the Namp 150 and the Pamp 224 are present, with a central VRDQ (e.g., a voltage reference of approximately 0.5V or 0.6V), both the Namp 150 and the Pamp 224 can be active (i.e., "on"), such that essentially the sum of the currents that the amps are supplying across their load resistors causes the gain of the amplifying device 82 to effectively increase. This causes VRDQ to move from low voltage (e.g., approximately 350 mV) to a high voltage (e.g., approximately 0.95*VDDQ), and associated gain increases accrue from the target gain level to approximately, for example, twice the target gain value 2× then back to target gain level as a gain curve.

To correct for this, the Pamp 224 includes a cross-over correction point 260. The cross-over correction point 260 operates to pull current from the Pamp 224. Thus, when both the Namp 150 and the Pamp 224 are active (e.g., operational at the same time or concurrently), the cross-over correction point 260 operates as a current sink to remove the tail current generated by the Pamp 224 (i.e., the current along path 254). This operates to reduce greatly the current to be mirrored by the mirrored fingers 258. This results in a reduced additional gain to the gain of the Namp 150, thus flattening the center point of the gain curve (i.e., where the gain increases to, for example, twice the target gain) so that there is not gain peaking when both the Namp 150 and the Pamp 224 are on.

Figure 13:
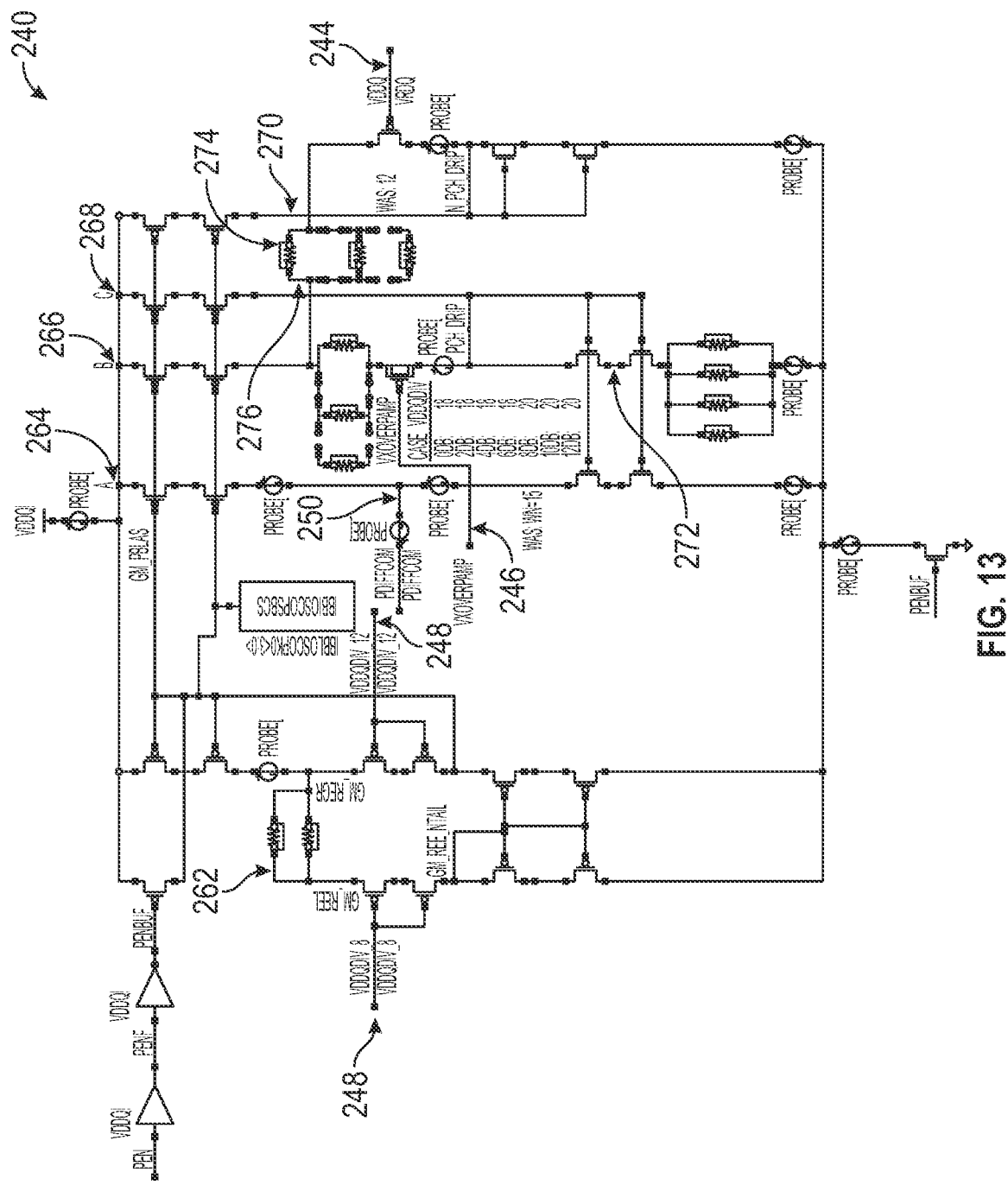
FIG. 13 illustrates a circuit diagram of an embodiment of the cross-over correction circuit of FIG. 11, according to an embodiment of the present disclosure.

FIG. 13 illustrates an embodiment of the cross-over correction circuit 240. It should be noted that the particular circuitry of the cross-over correction circuit 240 is provided as an example only. As illustrated, the cross-over correction circuit 240 includes resistors 262 that may be matched to load resistors of the Namp 150. Additionally, the voltages received at inputs 248 may be distinctive resistor string DAC tap voltages at predetermined locations. Additionally, as noted previously, because the DAC utilizes the supply voltage, the respective resistor string DAC tap voltages at inputs 248 scale linearly with the supply voltage VDDQ (i.e., change with changes to the VDDQ).

A current may be generated based upon the voltages at inputs 248 of FIG. 13 and this current may be transmitted to current mirror 264, current mirror 266, and current mirror 268. In operation, the cross-over correction circuit 240 utilizes a sensing circuit 270 coupled to each of the current mirror 264 and the input 244. The sensing circuit 270 may be constructed as a balanced resistance stage of the cross-over correction circuit 240 to provide gradual output current change as the VRDQ passes above and below the voltage received at input 246. The voltage received at input 246 can be a variable tap point from the VDDQ R-divider DAC and the voltage provided at input can vary for each gain increment of the Pamp 244 and/or may be the same voltage level for two or more of the gain increments of the Pamp 244. The degeneration on the first stage n-channel output mirror load (utilizing the n-channel diode 272) accelerates current level on the current mirror 266 connected to input 250.

Current mirror 266 may be referred to as an output current mirror, as it is connected to input 250 to receive current from the Pamp 224 via the cross-over correction point 260. The input 250 is a current source output connected to a common source of the Pamp 224. When the VRDQ voltage received at input 244 has a lower voltage than the voltage received at the input 246, the net current pulled through the input 250 is relatively low. This is due to the current mirror 268 maintaining a quiescent current through, for example, a diode load of the cross-over correction circuit 240, which when mirrored, subtracts from the current generated by current mirror 264. In this case, the current from current mirror 266 is diverted path 274 of the sensing circuit 270. As the VRDQ level approaches and/or exceeds the voltage level at input 246, additional current from the current mirror 266 is diverted to path 276 of the sensing circuit 270. This, in turn, increases the current pulled down at the input 250 and, correspondingly, from the cross-over correction point 260 of the Pamp 224. In this manner, the cross-over correction circuit 240 operates to stabilize gain that would otherwise vary when each of the Namp 150 and the Pamp 224 are active.

Returning to FIG. 11, it is noted that the VDDQ supply level correction circuit 110 additionally includes an input 278. This input 278 is coupled to output 238 of the Pamp 224 and receives a variable current source sinking current from the common source of the Pamp 224. This current scales up beginning at some point above the minimum VRDQ range and increases as VRDQ increases. Without this compensation, the total DC gain of the combined namp 150 and pamp 224 operation in the approximate mid-point of the VRDQ range would be prohibitively high. At low VRDQ voltages, only the pamp 224 is effectively impacting the gain of the overall amplifying device 82, while at high VRDQ voltages, only the namp 150 is impacting the gain of the overall amplifying device 82. It is near and through the mid-point VRDQ voltage where both the Namp 150 and Pamp 224 are in valid operating states and where the current transmitted to input 278 is taken from the pamp to suppress elevated gain of the combined currents of the Namp 150 and Pamp 224 being pulled across the load resistors in the namp 150 portion of the amplifying device 82. In this manner, the VDDQ supply level correction circuit 110 additionally assists in mitigating gain variation in the crossover range between the Namp 150 and the Pamp 224. Moreover, FIG. 9 illustrates an example of the input 250 of the VDDQ supply level correction circuit 110 that can be present when a Pamp 224 is utilized.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A device, comprising:
an amplifying device that when in operation transmits a data signal and a reference signal to a decision feedback equalizer (DFE) circuit, wherein the amplifying device comprises:
a variable gain amplifier (VGA) that when in operation generates the reference signal as having a predetermined gain relative to a received input signal comprising a DC reference signal received at an input of the VGA; and
a continuous-time linear equalizer (CTLE) that operates to mitigate inter-symbol interference (ISI) on the data signal from a data stream comprising the data signal; and
correction circuitry coupled to the amplifying device, wherein the correction circuitry comprises:
a supply level correction circuit that when in operation:
generates a first correction signal to compensate for a first variation in a supply voltage of the VGA based upon a selective comparison of a predetermined fraction of the supply voltage or a set voltage level and a second reference voltage; and
transmits the first correction signal to the VGA; and
an output common-mode correction circuit that when in operation:
generates a second correction signal to compensate for a second variation in an output common-mode voltage of the VGA and;
transmits the second correction signal to the VGA.

2. The device of claim 1, wherein the CTLE is internal to the VGA.

3. The device of claim 1, wherein the output common mode correction circuit comprises:
a first input configured to receive a third reference voltage; and
a second input configured to receive a predetermined set voltage, wherein the output common-mode correction circuit when in operation generates the second correction signal based upon a second selective comparison between the third reference voltage and the predetermined set voltage.

4. The device of claim 3, wherein the VGA comprises an N-type amplifier (Namp) comprising a common-mode correction point that when in operation receives the second correction signal.

5. The device of claim 4, wherein the common-mode correction point comprises at least one transistor, wherein the common-mode correction point operates as a mirror circuit to generate an output current that mirrors current generated by the output common-mode correction circuit as the second correction signal.

6. The device of claim 1, wherein the correction circuitry further comprises a temperature range correction circuit that when in operation generates a correction signal to compensate for a temperature variation in the VGA.

7. The device of claim 6, wherein the VGA comprises an N-type amplifier (Namp) comprising a temperature correction point that when in operation receives the correction signal.

8. The device of claim 1, wherein the VGA comprises an N-type amplifier (Namp) and a replica circuit coupled to the Namp, wherein the replica circuit when in operation generates a bias level of the Namp.

9. The device of claim 8, wherein the replica circuit comprises a supply level correction point that when in operation receives the first correction signal.

10. The device of claim 9, wherein the supply level correction point is coupled to a set of transistors of the replica circuit that operate to set the bias level, wherein the supply level correction point when in operation transmits the first correction signal as a current to the set of transistors of the replica circuit to offset the second variation in supply voltage of the VGA.

11. A device, comprising:
an amplifying device that when in operation transmits a data signal and a reference signal to a decision feedback equalizer (DFE) circuit, wherein the amplifying device comprises:
a variable gain amplifier (VGA) that when in operation generates the reference signal as having a predetermined gain relative to a received input signal comprising a DC reference signal received at an input of the VGA; and
a continuous-time linear equalizer (CTLE) that operates to mitigate inter-symbol interference (ISI) on the data signal from a data stream comprising the data signal; and
correction circuitry coupled to the amplifying device, wherein the correction circuitry when in operation mitigates a first variation in the predetermined gain of the VGA or a second variation in an output common-mode voltage of the VGA, wherein the correction circuitry comprises an output common-mode correction circuit that when in operation generates a correction signal to compensate for the second variation in the output common-mode voltage of the VGA, wherein the VGA comprises an N-type amplifier (Namp) comprising a common-mode correction point that when in operation receives the correction signal, wherein the common-mode correction point comprises at least one transistor, wherein the common-mode correction point operates as a mirror circuit to generate an output current that mirrors current generated by the output common-mode correction circuit as the correction signal, wherein the Namp comprises a set of current mirror fingers, wherein a gain of the VGA is based in part on a number of current mirror fingers activated of the set of current mirror fingers, and wherein the common-mode correction point is coupled to the set of current mirror fingers.

12. The device of claim 11, wherein the common-mode correction point when in operation transmits the output current to the set of current mirror fingers to increase the output common-mode voltage of the VGA to correct for the second variation in the output common-mode voltage of the VGA.

13. A device, comprising:
an amplifying device that when in operation transmits a data signal and a reference signal to a decision feedback equalizer (DFE) circuit, wherein the amplifying device comprises:
a variable gain amplifier (VGA) that when in operation generates the reference signal as having a predetermined gain relative to a received input signal comprising a DC reference signal received at an input of the VGA; and
a continuous-time linear equalizer (CTLE) that operates to mitigate inter-symbol interference (ISI) on the data signal from a data stream comprising the data signal; and
correction circuitry coupled to the amplifying device, wherein the correction circuitry when in operation mitigates a first variation in the predetermined gain of the VGA or a second variation in an output common-mode voltage of the VGA, wherein the correction circuitry comprises an output common-mode correction circuit that when in operation generates a correction signal to compensate for the second variation in the output common-mode voltage of the VGA, wherein the correction circuitry further comprises a temperature range correction circuit that when in operation generates a correction signal to compensate for a temperature variation in the VGA, wherein the VGA comprises an N-type amplifier (Namp) comprising a temperature correction point that when in operation receives the correction signal, wherein the Namp comprises a set of current mirror fingers, wherein a gain of the VGA is based in part on a number of current mirror fingers activated of the set of current mirror fingers, and wherein the temperature correction point is coupled to the set of current mirror fingers.

14. The device of claim 13, wherein the temperature correction point when in operation transmits the correction signal as a current to the set of current mirror fingers to offset variations in the gain of the VGA due to increases in temperature in the VGA.

* * * * *